United States Patent
Zhang et al.

(10) Patent No.: US 12,375,980 B2
(45) Date of Patent: Jul. 29, 2025

(54) SIGNALING RECEIVING METHOD, SIGNALING TRANSMITTING METHOD, AND DEVICE

(71) Applicant: ZTE CORPORATION, Shenzhen (CN)

(72) Inventors: Shujuan Zhang, Shenzhen (CN); Zhaohua Lu, Shenzhen (CN); Jianwei Wang, Shenzhen (CN); Chuangxin Jiang, Shenzhen (CN); Bo Gao, Shenzhen (CN); Wenjun Yan, Shenzhen (CN); Shuaihua Kou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 449 days.

(21) Appl. No.: 17/799,889

(22) PCT Filed: Feb. 2, 2021

(86) PCT No.: PCT/CN2021/075471
§ 371 (c)(1),
(2) Date: Aug. 15, 2022

(87) PCT Pub. No.: WO2021/160031
PCT Pub. Date: Aug. 19, 2021

(65) Prior Publication Data
US 2023/0092905 A1 Mar. 23, 2023

(30) Foreign Application Priority Data
Feb. 14, 2020 (CN) .......................... 202010093883.0

(51) Int. Cl.
*H04W 36/00* (2009.01)

(52) U.S. Cl.
CPC ... *H04W 36/0061* (2013.01); *H04W 36/0085* (2018.08)

(58) Field of Classification Search
None
See application file for complete search history.

(56) References Cited

U.S. PATENT DOCUMENTS

2016/0278055 A1 9/2016 Park et al.
2019/0306915 A1* 10/2019 Jin ........................ H04W 76/28
(Continued)

FOREIGN PATENT DOCUMENTS

| CN | 108111266 A | 6/2018 |
|----|-------------|--------|
| CN | 108111276 A | 6/2018 |

(Continued)

OTHER PUBLICATIONS

Samsung, "Measurement based on CSI-RS for L3 mobility," 3GPP TSG RAN WG1#90, R1-1713564, Prague, Czech Republic, Aug. 21, 2017, 8 pages.

(Continued)

*Primary Examiner* — Brandon M Renner
(74) *Attorney, Agent, or Firm* — Morgan, Lewis & Bockius LLP

(57) ABSTRACT

Provided are a signaling receiving method, a signaling transmitting method, and a device. The signaling receiving method includes receiving a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a bandwidth part (BWP), a BWP group, an information element, an information element group, a transmission configuration indicator (TCI)

(Continued)

Receive a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal ~S110 state, or a TCI state group. The information element includes at least one of the following: a channel or a signal.

21 Claims, 8 Drawing Sheets

(56) References Cited

U.S. PATENT DOCUMENTS

| | | | |
|---|---|---|---|
| 2020/0252821 A1* | 8/2020 | Deogun | H04W 76/19 |
| 2022/0167290 A1* | 5/2022 | Harada | H04L 5/0048 |

FOREIGN PATENT DOCUMENTS

| | | |
|---|---|---|
| CN | 110535596 A | 12/2019 |
| CN | 111901838 A | 11/2020 |
| WO | WO2019/199143 A1 | 10/2019 |

OTHER PUBLICATIONS

Extended European Search Report for Application No. 21754411.3, dated Mar. 13, 2024, 9 pages.
International Search Report for Application No. PCT/CN2021/075471, dated May 6, 2021, 4 pages including translation.

* cited by examiner

Receive a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal — S110

FIG. 1A

Transmit a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal — S210

FIG. 1B

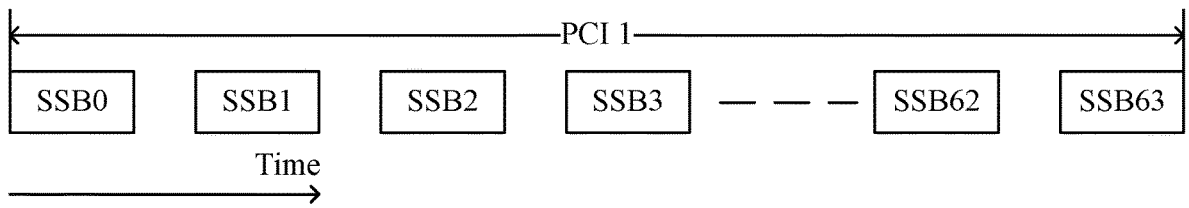

FIG. 1C

SIGNALING RECEIVING METHOD, SIGNALING TRANSMITTING METHOD, AND DEVICE

CROSS REFERENCE TO RELATED APPLICATIONS

This is a national stage application filed under 37 U.S.C. 371 based on International Patent Application No. PCT/CN2021/075471, filed Feb. 5, 2021, which claims priority to Chinese Patent Application No. 202010093883.0 filed Feb. 14, 2020, the disclosures of which are incorporated herein by reference in their entireties.

This application claims priority to Chinese Patent Application No. 202010093883.0 filed with the China National Intellectual Property Administration (CNIPA) on Feb. 14, 2020, the disclosure of which is incorporated herein by reference in its entirety.

TECHNICAL FIELD

The present application relates to the field of wireless communication networks, for example, a signaling receiving method, a signaling transmitting method, and a device.

BACKGROUND

In New Radio (NR) communications, mobility measurement information is configured through a radio resource control (RRC) signaling, and a terminal performs cell measurement according to a mobility measurement reference signal configured in the mobility measurement information. When the performance of a serving cell deteriorates, a channel switch is performed. Since the channel switch involves a quantity of higher-layer signaling interactions and uplink access, the channel switch delay is large. Therefore, the main problems to be solved are how to reduce a channel switch delay during a channel switch and improve the success rate of the channel switch and how to reduce the complexity of the channel switch between the communication parties such as a terminal.

SUMMARY

The present application provides a signaling receiving method, a signaling transmitting method, and a device.

An embodiment of the present application provides a signaling receiving method.

The signaling receiving method includes receiving a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a bandwidth part (BWP), a BWP group, an information element, an information element group, a transmission configuration indicator (TCI) state, or a TCI state group. The information element includes at least one of the following: a channel or a signal.

An embodiment of the present application provides a signaling transmitting method.

The signaling transmitting method includes transmitting a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

An embodiment of the present application provides a signaling receiving apparatus.

The signaling receiving apparatus includes a receiving module. The receiving module is configured to receive a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

An embodiment of the present application provides a signaling transmitting apparatus.

The signaling transmitting apparatus includes a transmitting module. The transmitting module is configured to transmit a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

An embodiment of the present application provides a device.

The device includes one or more processors and a memory. The memory is configured to store one or more programs. When executed by the one or more processors, the one or more programs cause the one or more processors to perform the method according to any embodiment of the present application.

An embodiment of the present application provides a storage medium. The storage medium stores a computer program which, when executed by a processor, causes the processor to perform the method according to any embodiment of the present application.

Through the method according to the present application, channels or signals corresponding to multiple first-type parameters (or combination values of (first-type parameter, second-type parameter)) can be included under one serving cell so that a station can flexibly switch between the channels or signals corresponding to the first-type parameters or combination values. These switches are transparent to a terminal. The terminal can simultaneously receive or transmit channels or signals corresponding to different first-type parameters or combination values, but the channels and/or signals corresponding to the first-type parameters are in one serving cell framework, so the terminal has one set of higher-layer protocols unlike the case of a Dual Active Protocol Stack (DAPS). In the DAPS, channels and/or signals corresponding to different cells are in different serving cell groups, so each cell has a respective one set of higher-layer protocols, and a terminal is required to maintain two higher-layer protocol stacks. Through the method according to the present application, links with multiple cells can be maintained while the channel switch delay is reduced; and the terminal is required to maintain only one higher-layer protocol stack while the switch success rate is improved, so the complexity of the terminal is reduced.

BRIEF DESCRIPTION OF DRAWINGS

FIG. 1A is a flowchart of a signaling receiving method according to the present application.

FIG. 1B is a flowchart of a signaling transmitting method according to the present application.

FIG. 1C is a diagram illustrating that one PCI corresponds to 64 time domain resource blocks, that is, 64 SSB indexes, and no quasi co-location relationship is satisfied between any two of the 64 SSBs.

DETAILED DESCRIPTION

Figure 2:
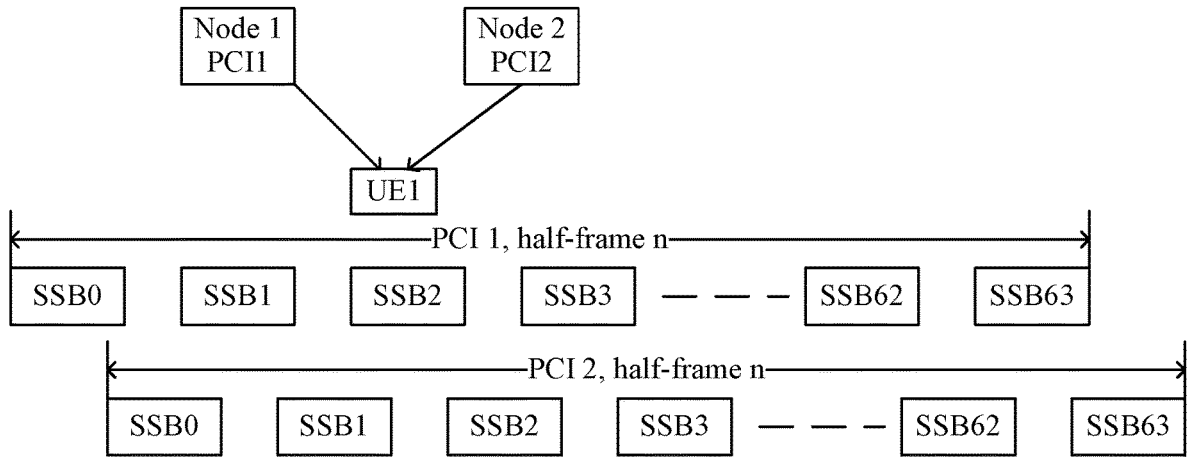
FIG. 2 is a diagram of code division or time division+code division of synchronization signals corresponding to different PCIs in one MeasObject.

Embodiments of the present application are described below in conjunction with drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein.

In the 3rd Generation Partnership Project Release 15 of NR (NR Rel-15), a terminal performs mobility measurement according to mobility measurement information configured by a base station through an RRC signaling and reports a measurement result to a source serving cell through the RRC signaling; and after the source serving cell receives the measurement result, if it is found that the performance of the source serving cell is poor, the channel switch process is initiated. The channel switch process depends on that the source serving cell sends the configuration information of a target serving cell to the terminal, and the terminal starts a random access process according to the received configuration information to access the target serving cell. After the terminal receives a random access response of the target serving cell, the switch process is completed. In the switch process, a delay occurs when the mobility measurement result is reported to the base station through the RRC signaling, a delay occurs when the source serving cell sends the configuration information of the target cell through the RRC signaling, and a delay occurs when the terminal accesses the target serving cell. As a result, in the switch process, the communication of the terminal is interrupted, or the communication quality is poor, affecting the system performance.

In the 3GPP Release 16 of NR (NR Rel-16), a channel switch process is enhanced by the introduced technologies including conditional switch (CHO) and dual active protocol stack (DAPS). The former requires a terminal to select one candidate target cell from several candidate target cells provided by a base station, reducing the control power of the base station. The latter requires a terminal to maintain communication with a source serving cell and a target serving cell at the same time, improving the complexity of the terminal.

Problems to be solved in the present application are how to reduce a switch delay to, for example, 0 ms and improve the switch success rate while maintaining the control power of the base station and the complexity of the terminal.

In an example embodiment, FIG. 1A is a flowchart of a signaling receiving method according to the present application. The method may be performed by a signaling receiving apparatus according to the present application. The apparatus may be implemented as software and/or hardware and integrated in a terminal.

As shown in FIG. 1A, the method according to this embodiment includes the process below.

In S110, a first signaling is received. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

A terminal receives the first signaling transmitted by a base station and determines the first-type parameter corresponding to the target element according to the first signaling. The physical cell identifier may be represented as PCI or represented in other manners.

In an example embodiment, the terminal may also determine the first-type parameter corresponding to the target element according to a first predetermined rule. The first predetermined rule may be set according to requirements.

In an example embodiment, the method according to the present application also includes determining, according to the first-type parameter corresponding to the target element, a first-type parameter corresponding to the information element associated with the target element.

In an example embodiment, in the case where the target element includes a control resource set (CORESET) or a CORESET group, the information element associated with the target element includes at least one of the following: an information element scheduled by a physical downlink control channel (PDCCH) in the target element; an information element in a physical downlink shared channel (PDSCH) scheduled by a PDCCH whose scheduling signaling is included in the target element; an information element associated with the target element and determined according to a second signaling, where the second signaling includes an association between the information element and the target element; or an information element associated with the target element and determined according to a second predetermined rule. The second signaling is a signaling transmitted by a base station and received by a terminal. The second predetermined rule may be configured according to requirements.

In an example embodiment, the information element associated with the target element is determined according to the second predetermined rule in one of the following manners: An association exists between a periodic or semi-persistent information element and a pre-indexed target element; or a first-type parameter corresponding to a periodic or semi-persistent information element is acquired according to a first-type parameter corresponding to a non-periodic information element, where the first-type parameter corresponding to the non-periodic information element is acquired according to a first-type parameter corresponding to a target element in which a PDCCH scheduling the non-periodic element is located.

In an example embodiment, determining, according to the first-type parameter corresponding to the target element, the first-type parameter corresponding to the information element associated with the target element includes determining, according to the first-type parameter corresponding to the target element, a first-type parameter corresponding to a third-type parameter of the information element associated with the target element.

In an example embodiment, in the case where the target element includes the information element, the information element associated with the target element includes at least one of the following: a quasi co-location reference signal of the target element; a reference signal in spatial relationship information of the target element; a pathloss reference signal of the target element; or an information element, where an association exists between the information element and the target element.

In an example embodiment, in the case where the target element includes the serving cell or the BWP, the information element associated with the target element includes an information element located in the target element.

In an example embodiment, determining, according to the first-type parameter corresponding to the target element, the first-type parameter corresponding to the information element associated with the target element includes determining a first-type parameter corresponding to a periodic or semi-persistent information element according to a first-type parameter corresponding to a non-periodic information element, where an association exists between the periodic or semi-persistent information element and the non-periodic information element.

In an example embodiment, in the case where the target element includes the TCI state, and the information element associated with the target element includes a quasi co-location reference signal in the TCI state, the method also includes one of the following: determining a reference signal resource corresponding to a quasi co-location reference signal index according to the quasi co-location reference signal index in the TCI state and the first-type parameter; or determining a parameter of a reference signal resource corresponding to a quasi co-location reference signal index according to the quasi co-location reference signal index in the TCI state and the first-type parameter.

With regard to the same quasi co-location reference signal index in the same TCI state, different first-type parameters each correspond to one quasi co-location reference signal resource. With regard to the same quasi co-location reference signal index in the same TCI state, different first-type parameters each correspond to one value of the parameter of the quasi co-location reference signal resource.

In an example embodiment, in the case where the target element includes a group, the group includes one of the following: the information element group, the TCI state group, the serving cell group, or the BWP group; and the first signaling includes the first-type parameter corresponding to the target element in one of the following manners: The first signaling includes a first-type parameter corresponding to the group, where elements in the group correspond to the same first-type parameter; or the first signaling includes a first-type parameter corresponding to an element in the group, where elements in the group correspond to the same first-type parameter.

In an example embodiment, the first signaling includes the first-type parameter corresponding to the target element and a second-type parameter corresponding to the target element. The second-type parameter includes at least one of the following: a frequency domain parameter, a slot structure parameter, a subcarrier spacing, a measurement object identifier (MeasObjectID), a measurement identifier (MeasID), a serving cell index, a measurement configuration identifier (MeasConfigID), cell group information, or an absolute radio-frequency channel number-ValueNR (ARFCN-ValueNR). One MeasID includes one MeasObjectID and one report configuration identifier (ReportConfigID).

In an example embodiment, the method according to the present application also includes determining at least one of the following information of the target element according to the second-type parameter: a frequency domain bandwidth, a frequency domain reference point A, or a MeasObject to which the target element belongs.

In an example embodiment, the method according to the present application also includes determining a third-type parameter corresponding to the target element according to the first-type parameter corresponding to the target element.

In an example embodiment, the method according to the present application also includes one of the following: determining the third-type parameter corresponding to the target element according to the first-type parameter and the second-type parameter corresponding to the target element; or determining the first-type parameter and the second-type parameter of the information element corresponding to the target element according to the first-type parameter and the second-type parameter corresponding to the target element.

In an example embodiment, determining, according to the first-type parameter corresponding to the target element, the third-type parameter corresponding to the target element includes determining a mapping between A values of the first-type parameter and B values of the third-type parameter corresponding to the target element. A is a positive integer greater than or equal to 1, and B is a positive integer less than or equal to A. A mapping between A values of the first-type parameter and B values of the third-type parameter corresponding to the target element may be determined according to signaling information or a predetermined rule.

In an example embodiment, determining the third-type parameter corresponding to the target element according to the first-type parameter corresponding to the target element and the second-type parameter corresponding to the target element includes determining a mapping between C combination values of the first-type parameter and the second-type parameter and D values of the third-type parameter corresponding to the target element. C is a positive integer greater than or equal to 1, and D is a positive integer less than or equal to C.

In an example embodiment, in the case where the target element includes the information element, and the first-type parameter includes the mobility measurement reference signal, the first signaling includes a mobility measurement reference signal corresponding to the information element. The first signaling includes at least one of the following: a configuration signaling of a quasi co-location reference signal of the information element; a configuration signaling of a spatial relationship of the information element; a configuration signaling of a pathloss reference signal of the information element; a configuration signaling of downlink timing of the information element; or a configuration signaling of a timing advance (TA) of the information element.

In an example embodiment, in the case where the target element includes the information element, and the first-type parameter includes the mobility measurement reference signal, the first signaling includes the mobility measurement reference signal corresponding to the information element in the following manner: The first signaling includes at least one of the following corresponding to the mobility measurement reference signal: a physical cell identifier, a MeasObjectID, a MeasConfigID, cell group information, or a resource index of the mobility measurement reference signal.

In an example embodiment, in the case where the mobility measurement reference signal includes a synchronization signal, a synchronization signal index corresponding to the mobility measurement reference signal belongs to a synchronization signal time domain index set selected from a MeasObject corresponding to the MeasObjectID. In an example embodiment, a synchronization signal time domain index corresponding to the mobility measurement reference signal belongs to a synchronization signal time domain index set selected from a MeasObject.

In an example embodiment, the first-type parameter or a MeasObject to which the target element belongs includes at least one of the following: a MeasObject corresponding to a serving cell measurement object (servingCellMO) in a serving cell in which the target element is located; a MeasObject whose frequency domain information satisfies a first predetermined condition and that corresponds to a target element whose serving cell has frequency domain information that satisfies the first predetermined condition; a MeasObject whose frequency domain information satisfies a second predetermined condition and that corresponds to a first-type parameter whose frequency domain information satisfies the second predetermined condition; or a MeasObject whose frequency domain information satisfies a third predetermined condition and that corresponds to a target element whose frequency domain information satisfies the third predetermined condition.

In an example embodiment, the first-type parameter or a MeasObject to which the target element belongs includes a MeasConfig corresponding to a cell group in which the target element is located.

In an example embodiment, the information element includes at least one of the following: a quasi co-location reference signal, a pathloss reference signal, a reference signal included in a spatial relationship, a CORESET, an information element in a serving cell, a data channel, a control channel, a reference signal, a synchronization signal, or a random access signal.

In an example embodiment, the first signaling includes at least one of the following: a radio resource control (RRC) signaling or a medium access control-control element (MAC-CE) signaling.

In an example embodiment, the first signaling includes the first-type parameter corresponding to the target element in the following manner: X values of the first-type parameter are configured, in an RRC signaling, for the target element, where X is a positive integer greater than or equal to 1.

In an example embodiment, in the case where the X values of the first-type parameter are configured, in the RRC signaling, for the target element, the following is also included: activating, for the target element, Y values among the X values of the first-type parameter through a MAC-CE signaling. Y is a positive integer less than or equal to X.

In an example embodiment, in the case where the target element includes the serving cell, the X values of the first-type parameter are configured, in the RRC signaling, for the target element in at least one of the following manners: One value of the first-type parameter is configured, in a common control signaling of the serving cell, for the serving cell; or at least one value of the first-type parameter is configured, in a dedicated control signaling of the serving cell, for the serving cell.

In an example embodiment, the first signaling includes the first-type parameter corresponding to the target element and the second-type parameter corresponding to the target element in the following manner: E combination values are configured, in an RRC signaling, for the target element. E is a positive integer greater than or equal to 1. The combination values are combination values of the first-type parameter and the second-type parameter.

In an example embodiment, the first signaling includes the first-type parameter corresponding to the target element and the second-type parameter corresponding to the target element also in the following manner: A MAC-CE signaling activates, for the target element, F combination values among the E combination values. F is a positive integer less than or equal to E.

In an example embodiment, in the case where the target element includes the serving cell, a third-type parameter corresponding to the target element includes at least one of the following: a slot structure parameter in the serving cell, a BWP parameter included in the serving cell, frequency domain information of the serving cell, an information element group in the serving cell, a parameter of an information element in the serving cell, a sequence parameter of a synchronization signal in the serving cell, or a common control signaling of the serving cell.

In an example embodiment, in the case where the target element includes the information element, a third-type parameter corresponding to the target element includes at least one of the following parameters of the information element: a time domain parameter, a frequency domain parameter, a code domain parameter, a quasi co-location parameter, a spatial sending filter parameter, downlink timing, a power parameter, a MeasObject corresponding to the information element, timing advance (TA) information, a parameter for determining information bits contained in the information element, or a sequence parameter of a synchronization signal corresponding to the information element.

In an example embodiment, in the first signaling, the first-type parameter corresponding to the target element includes at least one of the following: a first-type parameter configured for the target element through an RRC signaling; or a first-type parameter activated for the target element through a MAC-CE.

In an example embodiment, the TCI state group includes one of the following: a TCI state group composed of TCI states activated for a PDSCH in a BWP through a MAC-CE signaling; a TCI state group composed of TCI states activated for a PDSCH corresponding to a CORESET group through a MAC-CE signaling; a TCI state group composed of TCI states associated with same identification information in a frequency domain bandwidth; a TCI state group composed of TCI states associated with same identification information in a frequency domain bandwidth group; or a TCI state group composed of TCI states corresponding to a code point, where the code point is a code point corresponding to a TCI indication field in downlink control information (DCI). The identification information is included in the TCI state.

In an example embodiment, the method also includes receiving a third signaling. The third signaling includes at least one of the following information: whether the target element is a mobility measurement reference signal; whether a reference signal associated with the target element is a mobility measurement reference signal; selection information between the first-type parameter and a serving cell index included in the first signaling; or selection information between an information combination and a serving cell index included in the first signaling, where the information combination includes a combination of the first-type parameter and at least one of the following: frequency domain information, MeasObject information, MeasConfig information, or cell group information.

In an example embodiment, in the case where configuration information of the target element does not include the first-type parameter corresponding to the target element, the first-type parameter corresponding to the target element is a first-type parameter configured in a serving cell in which the target element is located; or in the case where configuration information of the target element does not include the first-type parameter corresponding to the target element, the first-type parameter corresponding to the target element is a first-type parameter configured in a common control signaling of a serving cell in which the target element is located.

In an example embodiment, the method also includes one of the following: determining a synchronization signal sequence corresponding to the mobility measurement reference signal or the target element according to the first-type parameter; and determining, according to the first-type parameter, the target element group to which the target element belongs, where each PCI corresponds to one target element group.

In an example embodiment, one of the following applies: One serving cell includes at least two target elements, where the at least two target elements included in the serving cell correspond to different first-type parameters; or one BWP includes at least two target elements, where the at least two target elements included in the BWP correspond to different first-type parameters.

In an example embodiment, in the case where the target element includes a quasi co-location reference signal in the TCI state, and one TCI state includes multiple quasi co-location reference signals, the first signaling includes the first-type parameter corresponding to the target element in one of the following manners: Each of the multiple quasi co-location reference signals in the one TCI state corresponds to one first-type parameter; the multiple quasi co-location reference signals in the one TCI state share one first-type parameter; or in the case where a first-type parameter corresponding to a first quasi co-location reference signal in the one TCI state is not configured, the first-type parameter corresponding to the first quasi co-location reference signal is determined according to a first-type parameter corresponding to a second quasi co-location reference signal in the one TCI state.

In an example embodiment, the physical cell identifier satisfies at least one of the following features: Physical cell identifiers included in different MeasObjects do not intersect; a physical cell identifier configured in any MeasObject does not intersect a physical cell identifier configured in a common control signaling of the serving cell; or physical cell identifiers configured in common signalings of different serving cells do not intersect.

In an example embodiment, the physical cell identifier corresponding to the target element satisfies at least one of the following features: The physical cell identifier belongs to a white cell list configured in a MeasObject; the physical cell identifier does not belong to a black cell list configured in a MeasObject; the physical cell identifier dose not intersect a physical cell identifier configured in a common control signaling of the serving cell; the physical cell identifier dose not intersect a physical cell identifier configured in a common control signaling of a target serving cell, where the target element is a target element of the target serving cell; or the physical cell identifier belongs to a predetermined physical cell identifier set in a predetermined MeasObject.

In an example embodiment, in the case where the target element includes the information element, the information element includes a quasi co-location reference signal, and a quasi co-location parameter associated with the quasi co-location reference signal belongs to a first quasi co-location parameter set, the quasi co-location reference signal satisfies one of the following features: A physical cell identifier corresponding to the quasi co-location reference signal satisfies a fourth predetermined condition; the first signaling includes a serving cell index and a first-type parameter corresponding to the quasi co-location reference signal; or a fifth predetermined condition is satisfied between frequency domain information of the quasi co-location reference signal and frequency domain information of the first serving cell.

In an example embodiment, the physical cell identifier satisfies the fourth predetermined condition in the following manner: The physical cell identifier corresponding to the quasi co-location reference signal belongs to a predetermined physical cell identifier set in a predetermined MeasObject. An association exists between the predetermined MeasObject and a second serving cell, or the fifth predetermined condition is satisfied between frequency domain information of the predetermined MeasObject and frequency domain information of a second serving cell. The second serving cell includes such an information element that a quasi co-location relationship is satisfied between the information element and the quasi co-location reference signal with respect to the quasi co-location parameter in the first quasi co-location parameter set.

In an example embodiment, the method also includes determining at least one of the following according to a first-type parameter activated in one frequency domain bandwidth: an information element set in the frequency domain bandwidth, a TCI state set in the frequency domain bandwidth, or a value of a third-type parameter of the frequency domain bandwidth.

In an example embodiment, the method also includes determining a reference signal resource corresponding to the target element according to a value of the first-type parameter and the index of the target element.

In an example embodiment, in the case where the target element includes a quasi co-location reference signal in the TCI state, the method also includes at least one of the following: determining a quasi co-location reference signal resource corresponding to a quasi co-location reference signal index according to the quasi co-location reference signal index in the TCI state and a first-type parameter corresponding to the quasi co-location reference signal; determining a parameter of a quasi co-location reference signal resource corresponding to a quasi co-location reference signal index according to the quasi co-location reference signal index in the TCI state and a first-type parameter corresponding to a quasi co-location reference signal; determining a first-type parameter corresponding to a quasi co-location reference signal in the TCI state according to a MAC-CE signaling; or determining an index of a quasi co-location reference signal in the TCI state according to a first-type parameter corresponding to the quasi co-location reference signal in the TCI state.

In an example embodiment, the TCI state satisfies at least one of the following features: With regard to the same quasi co-location reference signal index of one TCI state, each of the different values of the first-type parameter corresponds to one quasi co-location reference signal resource; with regard to the same quasi co-location reference signal index of one TCI state, each of the different values of the first-type parameter corresponds to one value of a parameter of a quasi co-location reference signal resource; the same TCI state is shared between multiple values of the first-type parameter; one TCI state includes configuration information of a correspondence between the first-type parameter and a quasi co-location reference signal index; or one TCI state includes configuration information of a correspondence between the first-type parameter and different values of a parameter of the same quasi co-location reference signal index.

In an example embodiment, in the case where the target element includes the serving cell, and one serving cell corresponds to multiple first-type parameters, each of the multiple first-type parameters corresponds to one parameter value set of a synchronization signal block (SSB).

In an example embodiment, in the case where the target element includes the information element, a first-type parameter corresponding to the information element is determined according to a sequence generation parameter of the information element; or a first-type parameter corresponding to a reference signal associated with the information element is determined according to a sequence generation parameter of the information element.

In an example embodiment, the method also includes determining at least one of the following according to at least one of a fourth signaling or a fourth predetermined rule: a measurement time of a first reference signal corresponding to the first-type parameter; a synchronization signal set corresponding to the first-type parameter; or whether a resource occupied by a second reference signal corresponding to the first-type parameter is an available resource of a predetermined information element, where the resource includes at least one of a time domain resource or a frequency domain resource.

In an example embodiment, at least one of the following applies: After a predetermined time begins, the configuration of a measurement gap (MeasGap) is omitted for the measurement time of a first reference signal corresponding to the first-type parameter. Before a predetermined time begins, the measurement time of a first reference signal corresponding to the first-type parameter is in a MeasGap. After a predetermined time begins, the configuration of an SSB-based RRM Measurement Timing Configuration (SMTC) is omitted for the measurement time of a synchronization signal corresponding to the first-type parameter. Before a predetermined time begins, the measurement time of a synchronization signal corresponding to the first-type parameter is in an SMTC. After a predetermined time begins, a synchronization signal set corresponding to the first-type parameter is a first set, where in the case where the target element includes a synchronization signal, the target element belongs to the first set. Before a predetermined time begins, a synchronization signal set corresponding to the first-type parameter is a second set, where in the case where the target element includes a synchronization signal, the target element belongs to the second set. After a predetermined time begins, a resource occupied by a second reference signal corresponding to the first-type parameter is not an available resource of the predetermined information element. Before a predetermined time begins, a resource occupied by a second reference signal corresponding to the first-type parameter is an available resource of the predetermined information element. The predetermined time includes one of the following: a predetermined time after the first signaling is received; or a predetermined time after a hybrid automatic repeat request acknowledgement (HARQ-ACK) feedback with regard to a PDSCH including the first signaling is sent.

In an example embodiment, a reference signal corresponding to the first-type parameter includes at least one of the following: a mobility measurement reference signal corresponding to the first-type parameter in a MeasObject; the target element that includes the information element; a synchronization signal corresponding to the first-type parameter; a reference signal corresponding to the first-type parameter and configured in a serving cell; a reference signal in a predetermined reference signal resource set corresponding to the first-type parameter; or a quasi co-location reference signal set associated with the first-type parameter in an activated TCI state.

In an example embodiment, in the case where the target element includes a quasi co-location reference signal in the TCI state, and one TCI state includes multiple quasi co-location reference signals, the first signaling includes the first-type parameter corresponding to the target element and the second-type parameter corresponding to the target element in one of the following manners: Each of the multiple quasi co-location reference signals in the one TCI state corresponds to one parameter combination value; the multiple quasi co-location reference signals in the one TCI state share one parameter combination value; in a case where a parameter combination value corresponding to a first quasi co-location reference signal in the one TCI state is not configured, the parameter combination value corresponding to the first quasi co-location reference signal in the one TCI state is determined according to a parameter combination value corresponding to a second quasi co-location reference signal in the one TCI state; or the multiple quasi co-location reference signals in the one TCI state share one second-type parameter, and each of the multiple quasi co-location reference signals corresponds to one first-type parameter. The parameter combination value includes a combination value of the first-type parameter and the second-type parameter.

In an example embodiment, the first-type parameter also includes a second-type parameter, where the second-type parameter includes at least one of the following: a frequency domain parameter, a slot structure parameter, a subcarrier spacing, a MeasObjectID, a MeasID, a serving cell index, a MeasConfigID, cell group information, or an ARFCN-ValueNR, wherein one MeasID comprises one MeasObjectID and one ReportConfigID.

In an example embodiment, FIG. 1B is a flowchart of a signaling transmitting method according to the present application. The method may be performed by a signaling transmitting apparatus according to the present application. The apparatus may be implemented as software and/or hardware and integrated in a base station.

As shown in FIG. 1B, the method according to this embodiment includes the process below.

In S210, a first signaling is transmitted. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

In an example embodiment, the method according to the present application also includes determining, according to the first-type parameter corresponding to the target element, a first-type parameter corresponding to the information element associated with the target element.

In an example embodiment, in the case where the target element includes a control resource set (CORESET) or a CORESET group, the information element associated with the target element includes at least one of the following: an information element scheduled by a physical downlink control channel (PDCCH) in the target element; an information element in a physical downlink shared channel (PDSCH) scheduled by a PDCCH whose scheduling signaling is included in the target element; an information element associated with the target element and determined according to a second signaling, where the second signaling includes an association between the information element and the target element; or an information element associated with the target element and determined according to a second predetermined rule. The second signaling is a signaling transmitted by a base station and received by a terminal. The second predetermined rule may be configured according to requirements.

In an example embodiment, the information element associated with the target element is determined according to the second predetermined rule in one of the following manners: An association exists between a periodic or semi-persistent information element and a pre-indexed target element; or a first-type parameter corresponding to a periodic or semi-persistent information element is acquired according to a first-type parameter corresponding to a non-periodic information element, where the first-type parameter corresponding to the non-periodic information element is acquired according to a first-type parameter corresponding to a target element in which a PDCCH scheduling the non-periodic element is located.

In an example embodiment, determining, according to the first-type parameter corresponding to the target element, the first-type parameter corresponding to the information element associated with the target element includes determining, according to the first-type parameter corresponding to the target element, a first-type parameter corresponding to a third-type parameter of the information element associated with the target element.

In an example embodiment, in the case where the target element includes the information element, the information element associated with the target element includes at least one of the following: a quasi co-location reference signal of the target element; a reference signal in spatial relationship information of the target element; a pathloss reference signal of the target element; or an information element, where an association exists between the information element and the target element.

In an example embodiment, in the case where the target element includes the serving cell or the BWP, the information element associated with the target element includes an information element located in the target element.

In an example embodiment, determining, according to the first-type parameter corresponding to the target element, the first-type parameter corresponding to the information element associated with the target element includes determining a first-type parameter corresponding to a periodic or semi-persistent information element according to a first-type parameter corresponding to a non-periodic information element, where an association exists between the periodic or semi-persistent information element and the non-periodic information element.

In an example embodiment, in the case where the target element includes the TCI state, and the information element associated with the target element includes a quasi co-location reference signal in the TCI state, the method also includes one of the following: determining a reference signal resource corresponding to a quasi co-location reference signal index according to the quasi co-location reference signal index in the TCI state and the first-type parameter; or determining a parameter of a reference signal resource corresponding to a quasi co-location reference signal index according to the quasi co-location reference signal index in the TCI state and the first-type parameter.

With regard to the same quasi co-location reference signal index in the same TCI state, different first-type parameters each correspond to one quasi co-location reference signal resource. With regard to the same quasi co-location reference signal index in the same TCI state, different first-type parameters each correspond to one value of the parameter of the quasi co-location reference signal resource.

In an example embodiment, in the case where the target element includes a group, the group includes one of the following: the information element group, the TCI state group, the serving cell group, or the BWP group; and the first signaling includes the first-type parameter corresponding to the target element in one of the following manners: The first signaling includes a first-type parameter corresponding to the group, where elements in the group correspond to the same first-type parameter; or the first signaling includes a first-type parameter corresponding to an element in the group, where elements in the group correspond to the same first-type parameter.

In an example embodiment, the first signaling includes the first-type parameter corresponding to the target element and a second-type parameter corresponding to the target element. The second-type parameter includes at least one of the following: a frequency domain parameter, a slot structure parameter, a subcarrier spacing, a measurement object identifier (MeasObjectID), a measurement identifier (MeasID), a serving cell index, a measurement configuration identifier (MeasConfigID), cell group information, or an absolute radio-frequency channel number-ValueNR (ARFCN-ValueNR). One MeasID includes one MeasObjectID and one report configuration identifier (ReportConfigID).

In an example embodiment, the method according to the present application also includes determining at least one of the following information of the target element according to the second-type parameter: a frequency domain bandwidth, a frequency domain reference point A, or a MeasObject to which the target element belongs.

In an example embodiment, the method according to the present application also includes determining a third-type parameter corresponding to the target element according to the first-type parameter corresponding to the target element.

In an example embodiment, the method according to the present application also includes one of the following: determining the third-type parameter corresponding to the target element according to the first-type parameter and the second-type parameter corresponding to the target element; or determining the first-type parameter and the second-type parameter of the information element corresponding to the target element according to the first-type parameter and the second-type parameter corresponding to the target element.

In an example embodiment, determining, according to the first-type parameter corresponding to the target element, the third-type parameter corresponding to the target element includes determining a mapping between A values of the first-type parameter and B values of the third-type parameter corresponding to the target element. A is a positive integer greater than or equal to 1, and B is a positive integer less than or equal to A. A mapping between A values of the first-type parameter and B values of the third-type parameter corresponding to the target element may be determined according to signaling information or a predetermined rule.

In an example embodiment, determining the third-type parameter corresponding to the target element according to the first-type parameter corresponding to the target element and the second-type parameter corresponding to the target element includes determining a mapping between C combination values of the first-type parameter and the second-type parameter and D values of the third-type parameter corresponding to the target element. C is a positive integer greater than or equal to 1, and D is a positive integer less than or equal to C.

In an example embodiment, in the case where the target element includes the information element, and the first-type parameter includes the mobility measurement reference signal, the first signaling includes a mobility measurement reference signal corresponding to the information element. The first signaling includes at least one of the following: a configuration signaling of a quasi co-location reference signal of the information element; a configuration signaling of a spatial relationship of the information element; a configuration signaling of a pathloss reference signal of the information element; a configuration signaling of downlink timing of the information element; or a configuration signaling of a timing advance (TA) of the information element.

In an example embodiment, in the case where the target element includes the information element, and the first-type parameter includes the mobility measurement reference signal, the first signaling includes the mobility measurement reference signal corresponding to the information element in the following manner: The first signaling includes at least one of the following corresponding to the mobility measurement reference signal: a physical cell identifier, a MeasObjectID, a MeasConfigID, cell group information, or a resource index of the mobility measurement reference signal.

In an example embodiment, in the case where the mobility measurement reference signal includes a synchronization signal, a synchronization signal index corresponding to the mobility measurement reference signal belongs to a synchronization signal time domain index set selected from a MeasObject corresponding to the MeasObjectID. In an example embodiment, a synchronization signal time domain index corresponding to the mobility measurement reference signal belongs to a synchronization signal time domain index set selected from a MeasObject.

In an example embodiment, the first-type parameter or a MeasObject to which the target element belongs includes at least one of the following: a MeasObject corresponding to a serving cell measurement object (servingCellMO) in a serving cell in which the target element is located; a MeasObject whose frequency domain information satisfies a first predetermined condition and that corresponds to a target element whose serving cell has frequency domain information that satisfies the first predetermined condition; a MeasObject whose frequency domain information satisfies a second predetermined condition and that corresponds to a first-type parameter whose frequency domain information satisfies the second predetermined condition; or a MeasObject whose frequency domain information satisfies a third predetermined condition and that corresponds to a target element whose frequency domain information satisfies the third predetermined condition.

In an example embodiment, the first-type parameter or a MeasObject to which the target element belongs includes a MeasConfig corresponding to a cell group in which the target element is located.

In an example embodiment, the information element includes at least one of the following: a quasi co-location reference signal, a pathloss reference signal, a reference signal included in a spatial relationship, a CORESET, an information element in a serving cell, a data channel, a control channel, a reference signal, a synchronization signal, or a random access signal.

In an example embodiment, the first signaling includes at least one of the following: a radio resource control (RRC) signaling or a medium access control-control element (MAC-CE) signaling.

In an example embodiment, the first signaling includes the first-type parameter corresponding to the target element in the following manner: X values of the first-type parameter are configured, in an RRC signaling, for the target element, where X is a positive integer greater than or equal to 1.

In an example embodiment, in the case where the X values of the first-type parameter are configured, in the RRC signaling, for the target element, the following is also included: activating, for the target element, Y values among the X values of the first-type parameter through a MAC-CE signaling. Y is a positive integer less than or equal to X.

In an example embodiment, in the case where the target element includes the serving cell, the X values of the first-type parameter are configured, in the RRC signaling, for the target element in at least one of the following manners: One value of the first-type parameter is configured, in a common control signaling of the serving cell, for the serving cell; or at least one value of the first-type parameter is configured, in a dedicated control signaling of the serving cell, for the serving cell.

In an example embodiment, the first signaling includes the first-type parameter corresponding to the target element and the second-type parameter corresponding to the target element in the following manner: E combination values are configured, in an RRC signaling, for the target element. E is a positive integer greater than or equal to 1. The combination values are combination values of the first-type parameter and the second-type parameter.

In an example embodiment, the first signaling includes the first-type parameter corresponding to the target element and the second-type parameter corresponding to the target element also in the following manner: A MAC-CE signaling activates, for the target element, F combination values among the E combination values. F is a positive integer less than or equal to E.

In an example embodiment, in the case where the target element includes the serving cell, a third-type parameter corresponding to the target element includes at least one of the following: a slot structure parameter in the serving cell, a BWP parameter included in the serving cell, frequency domain information of the serving cell, an information element group in the serving cell, a parameter of an information element in the serving cell, a sequence parameter of a synchronization signal in the serving cell, or a common control signaling of the serving cell.

In an example embodiment, in the case where the target element includes the information element, a third-type parameter corresponding to the target element includes at least one of the following parameters of the information element: a time domain parameter, a frequency domain parameter, a code domain parameter, a quasi co-location parameter, a spatial sending filter parameter, downlink timing, a power parameter, a MeasObject corresponding to the information element, timing advance (TA) information, a parameter for determining information bits contained in the information element, or a sequence parameter of a synchronization signal corresponding to the information element.

In an example embodiment, in the first signaling, the first-type parameter corresponding to the target element includes at least one of the following: a first-type parameter configured for the target element through an RRC signaling; or a first-type parameter activated for the target element through a MAC-CE.

In an example embodiment, the TCI state group includes one of the following: a TCI state group composed of TCI states activated for a PDSCH in a BWP through a MAC-CE signaling; a TCI state group composed of TCI states activated for a PDSCH corresponding to a CORESET group through a MAC-CE signaling; a TCI state group composed of TCI states associated with same identification information in a frequency domain bandwidth; a TCI state group composed of TCI states associated with same identification information in a frequency domain bandwidth group; or a TCI state group composed of TCI states corresponding to a code point, where the code point is a code point corresponding to a TCI indication field in downlink control information (DCI). The identification information is included in the TCI state.

In an example embodiment, the method also includes transmitting a third signaling. The third signaling includes at least one of the following information: whether the target element is a mobility measurement reference signal; whether a reference signal associated with the target element is a mobility measurement reference signal; selection information between the first-type parameter and a serving cell index included in the first signaling; or selection information between an information combination and a serving cell index included in the first signaling, where the information combination includes a combination of the first-type parameter and at least one of the following: frequency domain information, MeasObject information, MeasConfig information, or cell group information.

In an example embodiment, in the case where configuration information of the target element does not include the first-type parameter corresponding to the target element, the first-type parameter corresponding to the target element is a first-type parameter configured in a serving cell in which the target element is located; or in the case where configuration information of the target element does not include the first-type parameter corresponding to the target element, the first-type parameter corresponding to the target element is a first-type parameter configured in a common control signaling of a serving cell in which the target element is located.

In an example embodiment, the method also includes one of the following: determining a synchronization signal sequence corresponding to the mobility measurement reference signal or the target element according to the first-type parameter; and determining, according to the first-type parameter, the target element group to which the target element belongs, where each PCI corresponds to one target element group.

In an example embodiment, one of the following applies: One serving cell includes at least two target elements, where the at least two target elements included in the serving cell correspond to different first-type parameters; or one BWP includes at least two target elements, where the at least two target elements included in the BWP correspond to different first-type parameters.

In an example embodiment, in the case where the target element includes a quasi co-location reference signal in the TCI state, and one TCI state includes multiple quasi co-location reference signals, the first signaling includes the first-type parameter corresponding to the target element in one of the following manners: Each of the multiple quasi co-location reference signals in the one TCI state corresponds to one first-type parameter; the multiple quasi co-location reference signals in the one TCI state share one first-type parameter; or in the case where a first-type parameter corresponding to a first quasi co-location reference signal in the one TCI state is not configured, the first-type parameter corresponding to the first quasi co-location reference signal is determined according to a first-type parameter corresponding to a second quasi co-location reference signal in the one TCI state.

In an example embodiment, the physical cell identifier satisfies at least one of the following features: Physical cell identifiers included in different MeasObjects do not intersect; a physical cell identifier configured in any MeasObject does not intersect a physical cell identifier configured in a common control signaling of the serving cell; or physical cell identifiers configured in common signalings of different serving cells do not intersect.

In an example embodiment, the physical cell identifier corresponding to the target element satisfies at least one of the following features: The physical cell identifier belongs to a white cell list configured in a MeasObject; the physical cell identifier does not belong to a black cell list configured in a MeasObject; the physical cell identifier dose not intersect a physical cell identifier configured in a common control signaling of the serving cell; the physical cell identifier dose not intersect a physical cell identifier configured in a common control signaling of a target serving cell, where the target element is a target element of the target serving cell; or the physical cell identifier belongs to a predetermined physical cell identifier set in a predetermined measObject.

In an example embodiment, in the case where the target element includes the information element, the information element includes a quasi co-location reference signal, and a quasi co-location parameter associated with the quasi co-location reference signal belongs to a first quasi co-location parameter set, the quasi co-location reference signal satisfies one of the following features: A physical cell identifier corresponding to the quasi co-location reference signal satisfies a fourth predetermined condition; the first signaling includes a serving cell index and a first-type parameter corresponding to the quasi co-location reference signal; or a fifth predetermined condition is satisfied between frequency domain information of the quasi co-location reference signal and frequency domain information of the first serving cell.

In an example embodiment, the physical cell identifier satisfies the fourth predetermined condition in the following manner: The physical cell identifier corresponding to the quasi co-location reference signal belongs to a predetermined physical cell identifier set in a predetermined MeasObject. An association exists between the predetermined MeasObject and a second serving cell, or the fifth predetermined condition is satisfied between frequency domain information of the predetermined MeasObject and frequency domain information of a second serving cell.

The second serving cell includes such an information element that a quasi co-location relationship is satisfied between the information element and the quasi co-location reference signal with respect to the quasi co-location parameter in the first quasi co-location parameter set.

In an example embodiment, the method also includes determining at least one of the following according to a first-type parameter activated in one frequency domain bandwidth: an information element set in the frequency domain bandwidth, a TCI state set in the frequency domain bandwidth, or a value of a third-type parameter of the frequency domain bandwidth.

In an example embodiment, the method also includes determining a reference signal resource corresponding to the target element according to a value of the first-type parameter and the index of the target element.

In an example embodiment, in the case where the target element includes a quasi co-location reference signal in the TCI state, the method also includes at least one of the following: determining a quasi co-location reference signal resource corresponding to a quasi co-location reference signal index according to the quasi co-location reference signal index in the TCI state and a first-type parameter corresponding to the quasi co-location reference signal; determining a parameter of a quasi co-location reference signal resource corresponding to a quasi co-location reference signal index according to the quasi co-location reference signal index in the TCI state and a first-type parameter corresponding to a quasi co-location reference signal; determining a first-type parameter corresponding to a quasi co-location reference signal in the TCI state according to a MAC-CE signaling; or determining an index of a quasi co-location reference signal in the TCI state according to a first-type parameter corresponding to the quasi co-location reference signal in the TCI state.

In an example embodiment, the TCI state satisfies at least one of the following features: With regard to the same quasi co-location reference signal index of one TCI state, each of the different values of the first-type parameter corresponds to one quasi co-location reference signal resource; with regard to the same quasi co-location reference signal index of one TCI state, each of the different values of the first-type parameter corresponds to one value of a parameter of a quasi co-location reference signal resource; the same TCI state is shared between multiple values of the first-type parameter; one TCI state includes configuration information of a correspondence between the first-type parameter and a quasi co-location reference signal index; or one TCI state includes configuration information of a correspondence between the first-type parameter and different values of a parameter of the same quasi co-location reference signal index.

In an example embodiment, in the case where the target element includes the serving cell, and one serving cell corresponds to multiple first-type parameters, each of the multiple first-type parameters corresponds to one parameter value set of an SSB.

In an example embodiment, in the case where the target element includes the information element, a first-type parameter corresponding to the information element is determined according to a sequence generation parameter of the information element; or a first-type parameter corresponding to a reference signal associated with the information element is determined according to a sequence generation parameter of the information element.

In an example embodiment, the method also includes determining at least one of the following according to at least one of a fourth signaling or a fourth predetermined rule: a measurement time of a first reference signal corresponding to the first-type parameter; a synchronization signal set corresponding to the first-type parameter; or whether a resource occupied by a second reference signal corresponding to the first-type parameter is an available resource of a predetermined information element, where the resource includes at least one of a time domain resource or a frequency domain resource.

In an example embodiment, at least one of the following applies: After a predetermined time begins, the configuration of a measurement gap (MeasGap) is omitted for the measurement time of a first reference signal corresponding to the first-type parameter. Before a predetermined time begins, the measurement time of a first reference signal corresponding to the first-type parameter is in a MeasGap. After a predetermined time begins, the configuration of an SMTC is omitted for the measurement time of a synchronization signal corresponding to the first-type parameter. Before a predetermined time begins, the measurement time of a synchronization signal corresponding to the first-type parameter is in an SMTC. After a predetermined time begins, a synchronization signal set corresponding to the first-type parameter is a first set, where in the case where the target element includes a synchronization signal, the target element belongs to the first set. Before a predetermined time begins, a synchronization signal set corresponding to the first-type parameter is a second set, where in the case where the target element includes a synchronization signal, the target element belongs to the second set. After a predetermined time begins, a resource occupied by a second reference signal corresponding to the first-type parameter is not an available resource of the predetermined information element. Before a predetermined time begins, a resource occupied by a second reference signal corresponding to the first-type parameter is an available resource of the predetermined information element. The predetermined time includes one of the following: a predetermined time after the first signaling is received; or a predetermined time after a hybrid automatic repeat request acknowledgement (HARQ-ACK) feedback with regard to a PDSCH including the first signaling is sent.

In an example embodiment, a reference signal corresponding to the first-type parameter includes at least one of the following: a mobility measurement reference signal corresponding to the first-type parameter in a MeasObject; the target element that includes the information element; a synchronization signal corresponding to the first-type parameter; a reference signal corresponding to the first-type parameter and configured in a serving cell; a reference signal in a predetermined reference signal resource set corresponding to the first-type parameter; or a quasi co-location reference signal set associated with the first-type parameter in an activated TCI state.

In an example embodiment, in the case where the target element includes a quasi co-location reference signal in the TCI state, and one TCI state includes multiple quasi co-location reference signals, the first signaling includes the first-type parameter corresponding to the target element and the second-type parameter corresponding to the target element in one of the following manners: Each of the multiple quasi co-location reference signals in the one TCI state corresponds to one parameter combination value; the multiple quasi co-location reference signals in the one TCI state share one parameter combination value; in a case where a parameter combination value corresponding to a first quasi co-location reference signal in the one TCI state is not configured, the parameter combination value corresponding to the first quasi co-location reference signal in the one TCI state is determined according to a parameter combination value corresponding to a second quasi co-location reference signal in the one TCI state; or the multiple quasi co-location reference signals in the one TCI state share one second-type parameter, and each of the multiple quasi co-location reference signals corresponds to one first-type parameter. The parameter combination value includes a combination value of the first-type parameter and the second-type parameter.

In an example embodiment, the first-type parameter also includes a second-type parameter, where the second-type parameter includes at least one of the following: a frequency domain parameter, a slot structure parameter, a subcarrier spacing, a MeasObjectID, a MeasID, a serving cell index, a MeasConfigID, cell group information, or an ARFCN-ValueNR, wherein one MeasID comprises one MeasObjectID and one ReportConfigID.

The solution according to the present application is described in more detail by using the embodiments below.

In an example embodiment, a base station configures a MeasConfig for a terminal through an RRC signaling. Each serving cell group corresponds to one MeasConfig. Each serving cell group may be a master cell group (MCG) or a secondary cell group (SCG). The MeasConfig includes one or more measurement links (meas). In each MeasConfig, one meas includes the following information: the MeasID of the meas, one MeasObject, and one report configuration (ReportConfig), that is, an association is established between the MeasObject and the ReportConfig. Therefore, the name here is measurement link. Other names are also allowed. Information such as a trigger condition for reporting inter-cell measurement information is configured in the ReportConfig. Configuration elements configured in each MeasObject are described in Table 1.

TABLE 1

| Configuration elements configured in MeasObject | Configuration value | Meaning of Configuration elements |
| --- | --- | --- |
| ssbFrequency | ARFCN-ValueNR | Frequency domain information of SSB |
| ssbSubcarrierSpacing | SubcarrierSpacing | Subcarrier spacing of SSB |
| smtc1 | SSB-MTC | SMTC information of SSB |
| smtc2 | SSB-MTC2 | SMTC information of SSB |
| refFreqCSI-RS | ARFCN-ValueNR | Point A information of CSI-RS |
| referenceSignalConfig | referenceSignalConfig | Configuration information of CSI-RS |
| blackCellsToAddModList | One or more PCI-RangeElements | Information about a black cell list |
| whiteCellsToAddModList | One or more PCI-RangeElements | Information about a white cell list |

As described in Table 1, information about the initial PCI and information about the PCI length are configured in one PCI-RangeElement. That is, one PCI-RangeElement includes one PCI or multiple consecutive PCIs. The SSB information in Table 1 includes SSB information corresponding to all PCIs in the MeasObject. One frequency domain (for example, one ssbFrequency in Table 1) corresponds to multiple PCIs. One frequency domain in an NR protocol corresponds to at most 1008 PCIs. One PCI corresponds to multiple SSBs in the time domain. SSBs in different time domains are represented by ssb-Index. As shown in FIG. 1C, one PCI corresponds to 64 SSBs in the time domain. SSBs having different time domain indexes represent different quasi co-location reference signal resources. Different SSB indexes correspond to different transmit beams of the base station. In FIG. 1C, SSB sequences transmitted in 64 time-domain SSBs corresponding to one PCI are the same. The SSB sequences include primary synchronization signals (PSSs) and secondary synchronization signals (SSSs). One (PSS, SSS) combination corresponds to one PCI. PSS and SSS sequence generation parameters in a (PSS, SSS) combination include the PCI information.

In FIG. 1C, 64 time-domain SSBs corresponding to PCI 1 are transmitted periodically. For example, the 64 SSBs occupy a time domain resource span of 5 ms with a period of 20 ms, so among each four 5 ms, an SSB exists in one 5 ms. PCI 1 in one MeasObject corresponds to 64 time-domain SSBs. PCI 2 in one MeasObject corresponds to 64 time-domain SSBs. SSBs corresponding to the two PCIs occupy the same time domain resources, but correspond to different SSB sequence information. That is, different PCIs on an ssbFrequency are code-divided. If SSBs corresponding to different PCIs are transmitted by different nodes to the same terminal, when the transmission delay differences between the different nodes and the terminal are large, for example, beyond the cyclic prefix (CP) range, different PCIs cannot share downlink timing even if the two nodes are synchronous in terms of transmit time. In this case, the terminal obtains downlink timing corresponding to different PCIs according to SSBs corresponding to the PCIs. As shown in FIG. 2, SSBs corresponding to different PCIs may be considered as both code-divided and time-divided.

As described in Table 1, the referenceSignalConfig is used for configuration of a measurement reference signal included in the MeasObject. For simplicity, this measurement reference signal is called mobility measurement reference signal. The referenceSignalConfig includes configuration elements described in Table 2.

TABLE 2

| Configuration elements configured in referenceSignalConfig | Configuration value | Meaning of configuration element |
| --- | --- | --- |
| ssb-ConfigMobility | SSB-ConfigMobility | Information such as time domain index set where SSB is located |
| CSI-RS-ResourceConfigMobility | CSI-RS-Resource ConfigMobility | Information such as subcarrier spacing information of CSI-RS and PCI information corresponding to CSI-RS |

As described in Table 2, time domain selection information of an SSB is configured in the ssb-ConfigMobility. For example, when the maximum number of time-domain SSBs is 64, as shown in FIG. 1C, the base station configures which SSBs of the 64 SSBs shown in FIG. 1C are required to be measured by the terminal. For example, the 64 SSBs are represented by 64 bits and the terminal is required to detect only four of the 64 time-domain SSBs. All PCIs included in the measObject in Table 2 share one ssb-ConfigMobility. In table 2, the CSI-RS-ResourceConfigMobility is used for configuration of CSI-RS information included in the measObject. The CSI-RS-ResourceConfigMobility includes configuration elements described in Table 3.

TABLE 3

| Configuration elements configured in CSI-RS-ResourceConfigMobility | Configuration value | Meaning of configuration element |
| --- | --- | --- |
| subcarrierSpacing | subcarrierSpacing | Subcarrier spacing of CSI-RS |
| csi-RS-CellList-Mobility | One or more CSI-RS-CellMobilities | Mobility CSI-RS information corresponding to each cell |
| refServCellIndex-v1530 | ServCellIndex | Serving cell ID referenced by timing of CSI-RS resource not configured with associated SSB of Table 5 |

The csi-RS-CellMobility in Table 3 includes configuration elements described in Table 4.

TABLE 4

| Configuration Element Configured in CSI-RS-CellMobility | Configuration Value | Meaning of Configuration Element |
| --- | --- | --- |
| cellId | PhysCellId | Subcarrier spacing of CSI-RS |
| csi-rs-MeasurementBW | {nrofPRBs, startPRB} | Mobility CSI-RS information corresponding to each cell |
| density | 1 or 3 | Frequency domain density of CSI-RS |
| csi-rs-ResourceList-Mobility | One or more CSI-RS-Resource-Mobilities | One or more Mobility CSI-RS resources corresponding to the CellID (PCI) |

As can be seen from Table 3 and Table 4, CSI-RS information corresponding to multiple PCIs is configured in the CSI-RS-ResourceConfigMobility, but CSI-RSs corresponding to multiple PCIs have the same subcarrier spacing. As described in Table 3, each CSI-RS-CellMobility corresponds to one PCI (that is, PhysCellId). In the CSI-RS-Resource-Mobility of Table 4, time domain symbol information, slot information, period information, resource element (RE) information, and code domain information occupied by each Mobility CSI-RS resource are configured. See Table 5.

TABLE 5

| Configuration elements configured in CSI-RS-Resource-Mobility | Configuration value | Meaning of configuration element |
| --- | --- | --- |
| csi-RS-Index | cSI-RS-Index | Mobility CSI-RS resource index |
| slotConfig | A value in {0~317} | Period and period bias of Mobility CSI-RS resource |
| associatedSSB | {ssb-Index, isQuasiColocated} | The time of the Mobility CSI-RS resource is based on the time of the cell corresponding to the cellId configured in the CSI-RS-CellMobility, if the associated SSB is configured, but the isQuasiColocated is used for configuration of a quasi co-location relationship satisfied between the Mobility CSI-RS resource and the SSB. |
| frequencyDomainAllocation | Start RE position | One or more Mobility CSI-RS resources corresponding to the PCI |
| firstOFDMSymbolInTimeDomain | A value in {0~13} | Time domain symbol occupied by CSI-RS in a slot |
| sequenceGenerationConfig | A value in {0~1024} | |

As described in Table 5, in the case where the associatedSSB is configured for a Mobility CSI-RS resource, the timing of the Mobility CSI-RS resource is acquired based on the CellID configured in the CSI-RS-CellMobility. In this case, if the terminal detects no SSB corresponding to (ssb-Index configured in associatedSSB, CellID configured in CSI-RS-CellMobility), the terminal does not detect the Mobility CSI-RS resource. If the associatedSSB is not configured for a Mobility CSI-RS resource, the terminal needs to measure the Mobility CSI-RS resource regardless of whether the terminal can detect any SSB corresponding to the CellID configured in the CSI-RS-CellMobility. The timing of the CSI-RS-CellMobility is acquired based on the refServCellIndex configured in the CSI-RS-ResourceConfigMobility.

In an example embodiment, a first-type parameter corresponding to a target element is determined according to a first signaling and/or a first predetermined rule. The target element includes one of the following: a serving cell, a serving cell group, a BWP, a BWP group, an information element, an information element group, a TCI state, or a TCI state group. The information element includes at least one of the following: a channel or a signal. In an example embodiment, a third-type parameter corresponding to the target element is determined according to the PCI information.

In an example embodiment, in the case where the target element includes the serving cell, a third-type parameter corresponding to the target element includes at least one of the following: a slot structure parameter in the serving cell, a BWP included in the serving cell, frequency domain information of the serving cell, an information element group in the serving cell, a parameter of an information element in the serving cell, a sequence parameter of a synchronization signal in the serving cell, or a common control signaling of the serving cell.

In an example embodiment, in the case where the target element includes the information element, a third-type parameter corresponding to the information element includes at least one of the following parameters of the information element: a time domain parameter, a frequency domain parameter, a code domain parameter, a quasi co-location parameter, a spatial transmitting filter parameter, downlink timing, a power parameter, a MeasObject corresponding to the information element, timing advance (TA) information, a parameter for determining information bits comprised in the information element, or a sequence parameter of a synchronization signal corresponding to the information element.

In an example embodiment, in the case where the target element includes the BWP, a third-type parameter corresponding to the information element includes at least one of the following parameters of the information element: subcarrier spacing, a physical resource block (PRB) set, or SSB information included in the BWP.

In an example embodiment, a mapping is established between A values of the PCI information and B values of the third-type parameter corresponding to the target element. For example, the third-type parameter corresponding to the target element includes parameter 1. See Table 6.

TABLE 6

| Value of PCI | Value of parameter 1 |
| --- | --- |
| PCI1 | First value |
| PCI2 | Second value |

As described in Table 6, the value of parameter 1 corresponding to the target element is acquired according to the PCI corresponding to the target element. For example, the target element includes a PDSCH, the third-type parameter corresponding to the target element includes rate matching information, and a correspondence exists between the PCI and the rate matching information. The rate matching information corresponding to the PDSCH is determined according to the PCI corresponding to the PDSCH so that different PCIs can correspond to different rate matching information.

In an example embodiment, in the case where the target element includes the information element, a code domain parameter in the third-type parameter of the information element includes a scrambling sequence parameter of a channel. For example, a channel scrambling process is performed on channel-encoded information bits b(i) included in the PDSCH before modulation. See equation (1).

$$d(i)=b(i)+c(i), i=0,1,\ldots L-1 \quad (1)$$

In the equation (1), L denotes the total number of information bits, c(i) denotes the PCI information included in the initialization parameter of a pseudo-random sequence, and d(i) denotes scrambled information bits.

In an example embodiment, in the case where the target element includes the information element, a code domain parameter in the third-type parameter of the information element includes a sequence parameter of a reference signal, that is, the PCI information included in a sequence generation parameter of the reference signal.

In an example embodiment, in the case where the third-type parameter corresponding to the target element includes the downlink timing of the information element, when it is determined that the PCI corresponding to the information element is PCI1, the downlink timing of the target element is determined according to the reference signal corresponding to PCI1. For example, the downlink timing of the target element is determined according to an SSB corresponding to PCI1 in the following manner: The downlink timing of the target element may be determined according to any SSB detected by the terminal in PCI1, may be determined according to an SSB indicated by the base station in PCI1, or may be determined according to any SSB detected by the terminal in one SSB set indicated by the base station in PCI1. When it is determined that the PCI corresponding to the information element is PCI2, the downlink timing of the target element is determined according to the reference signal corresponding to PCI2. The reference signal corresponding to the PCI may also be the CSI-RS mobility measurement reference signal indicated for the PCI in the MeasObject, for example, the csi-rs-ResourceList-Mobility configured in Table 4.

In an example embodiment, in the case where the third-type parameter corresponding to the target element includes the serving cell or BWP parameter, the third-type parameter of the target element includes a parameter of an SSB in the target element. When the PCI corresponding to the serving cell or BWP is determined, the parameter of the SSB in the serving cell or BWP is the parameter of the SSB corresponding to the PCI. The parameter of the SSB includes at least one of the following: a time domain selection parameter of the SSB, a period parameter of the SSB, or a power parameter of the SSB.

In an example embodiment, in the case where the target element includes the information element, the information element includes the information element in the serving cell. The information element includes a channel and/or a signal.

In an example embodiment, a correspondence is established between the information element and the mobility measurement reference signal. The mobility measurement reference signal is used for inter-cell mobility measurement, or the mobility measurement reference signal includes a measurement reference signal configured in the MeasObject. The information element includes a channel and/or a signal.

In an example embodiment, the third-type parameter of the information element is acquired according to a mobility measurement reference signal related with the information element. The third-type parameter of the information element includes at least one of the following: a quasi co-location parameter, a spatial sending filter parameter, downlink timing, a power parameter, or TA information.

In an example embodiment, in the where the third-type parameter includes the quasi co-location parameter, the correspondence includes a quasi co-location relationship, that is, a quasi co-location relationship is satisfied between the information element and the mobility measurement reference signal. In an example embodiment, in the case where the third-type parameter includes the spatial sending filter parameter, the correspondence includes a spatial sending filter relationship, that is, the spatial sending filter of the information element is acquired according to the spatial receiving filter of the mobility measurement reference signal having the correspondence with the information element. In an example embodiment, in the case where the third-type parameter includes the downlink timing, the downlink timing of the information element is acquired according to the mobility measurement reference signal having the correspondence with the information element.

In an example embodiment, in the case where the third-type parameter includes the power parameter, the power parameter of the information element is acquired according to the mobility measurement reference signal having the correspondence with the information element. For example, a pathloss parameter of the power parameter of the information element is acquired according to the mobility measurement reference signal having the correspondence with the information element.

In an example embodiment, in the case where the third-type parameter includes the TA information, the TA information of the information element is acquired according to the mobility measurement reference signal having the correspondence with the information element. For example, the TA information of the information element is TA information whose downlink timing is acquired according to the mobility measurement reference signal having the correspondence with the information element.

In an example embodiment, configuration information for configuration of the third-type parameter of the information element includes information about the mobility measurement reference signal, for example, resource index information of the mobility measurement reference signal. The configuration information for configuration of the third-type parameter of the information element also includes at least one of the following information of the mobility measurement reference signal: PCI information, MeasObject information, MeasConfig information, or cell group information. For example, the mobility measurement reference signal having the correspondence with the information element is a mobility measurement reference signal corresponding to the PCI information in the MeasObject in the MeasConfig corresponding to the cell group, where the mobility measurement reference signal includes a CSI-RS and/or an SSB. For example, in the case where the mobility measurement reference signal includes the CSI-RS, the resource index of the mobility measurement reference signal includes a csi-RS-Index in Table 5. In the case where the mobility measurement reference signal includes the SSB, the SSB index belongs to an SSB index selected in the MeasObject, that is, the SSB index selected in the ssb-ConfigMobility in Table 2.

The preceding describes the establishment of the correspondence between the information element and the mobility measurement reference signal. Similarly, a correspondence between the target element and the mobility measurement reference signal may be established, where the target element includes at least one of the following: a serving cell, a serving cell group, a BWP, a BWP group, an information element, an information element group, a TCI state, or a TCI state group, where the information element includes a channel and/or a signal.

In an example embodiment, in the case where the target element includes the information element, the information element includes an information element in the serving cell.

In an example embodiment, in the case where a quasi co-location reference signal is configured, a PCI and a second-type parameter corresponding to the quasi co-location reference signal (that is, the information element in the target element) are configured. The second-type parameter includes at least one of the following: a MeasObjectID, a serving cell index (servCellIndex), an ARFCN-ValueNR, a MeasID, a MeasConfigID, or cell group information. The ARFCN-ValueNR amounts to a frequency domain reference point for determining point A. Frequency domain resources of the quasi co-location reference signal are all obtained using point A as the reference point.

Configuration information included in the TCI state (that is, the TCI state in the target element) of the quasi co-location reference signal is described in Table 7. Configuration information of the quasi co-location information (Quasi-Co-location-Info (QCL-Info)) is described in Table 8. The QCL-Info includes the PCI and the second-type parameter. Types A to D represent different quasi co-location parameters. Type A includes the following quasi co-location parameters: a Doppler shift, a Doppler spread, an average delay, and a delay spread. Type B includes the following quasi co-location parameters: a Doppler shift and a Doppler spread. Type C includes the following quasi co-location parameters: a Doppler shift and an average delay. Type D includes the following quasi co-location parameter: a Spatial Rx parameter.

TABLE 7

| Information included in TCI state n | Configuration content |
| --- | --- |
| TCI stateID | Index of a TCI state |
| qcl-Type1 | QCL-Info, configuration of quasi co-location reference signal and associated quasi co-location parameter |
| qcl-Type2 | QCL-Info, configuration of quasi co-location reference signal and associated quasi co-location parameter |

TABLE 8

| Information included in QCL-Info | Configuration content |
| --- | --- |
| Second-type parameter | One of MeasObjectID, ServCellIndex, or ARFCN-ValueNR |
| PCI | PhysCellID |
| bwp-Id | BWP where referenceSignal is located |
| referenceSignal | Quasi co-location reference signal, including one of SSB or CSI-RS |
| qcl-Type | Type A, Type B, Type C, Type D |

Table 7 and Table 8 illustrate one configuration method of the quasi co-location reference signal. Other configuration methods of the quasi co-location reference signal are also allowed in this embodiment.

In an example embodiment, the second-type parameter is used for determining at least one of the following: the frequency domain information of the quasi co-location reference signal (for example, the referenceSignal in Table 8) or the MeasObject to which the quasi co-location reference signal belongs. Optionally, the frequency domain information includes at least one of the following: frequency domain bandwidth information of the quasi co-location reference signal and frequency domain reference point information point A of the quasi co-location reference signal.

As described in Table 8, the QCL-Info includes information of the bwp-Id, indicating the BWP in which the referenceSignal is located. In the case where the quasi co-location reference signal includes the CSI-RS (for example, the CSI-RS-Index in Table 5), the quasi co-location reference signal includes a mobility measurement reference signal within the BWP range or includes a mobility measurement reference signal included in the BWP range. In this embodiment, the following also applies: In the case where the QCL-Info does not include the bwp-Id, for example, in the case where the quasi co-location reference signal includes the mobility measurement reference signal, the frequency domain bandwidth in which the quasi co-location reference signal is located includes the frequency domain bandwidth configured in the csi-rs-measurementBW in Table 4.

In an example embodiment, if the second-type parameter is the MeasObjectID, the frequency domain information of the quasi co-location reference signal (the referenceSignal in Table 8) is determined by the frequency domain information in the MeasObject corresponding to the MeasObjectID. For example, the frequency domain information of the quasi co-location reference signal is determined according to the ssbFrequency (or the refFreqCSI-RS) configured in the MeasObject in Table 1. In the case where the quasi co-location reference signal is SSB, the frequency domain information of the quasi co-location reference signal is determined according to the ssbFrequency. In the case where the quasi co-location reference signal is the CSI-RS, the frequency domain information of the quasi co-location reference signal is determined according to the refFreqCSI-RS. In this case, optionally, the quasi co-location reference signal belongs to the reference signal included in the referenceSignalConfig in the MeasObject in Table 1. The MeasObject corresponds to MeasObjectID.

In an example embodiment, in the case where the second-type parameter is the servCellIndex, the frequency domain information of the referenceSignal is determined according to the serving cell corresponding to the servCellIndex. For example, the frequency domain information of the referenceSignal is determined according to point A configured in the serving cell. Optionally, the frequency domain information of the referenceSignal is determined according to a carrier that is located in the serving cell and that has the same subcarrier spacing as the referenceSignal. For example, the frequency domain information of the referenceSignal is determined according to a parameter configured in the SCS-SpecificCarrier that is located in a subcarrier spacing-specific carrier list (SCS-SpecificCarrierList) in the serving cell and that has the same subcarrier spacing as the referenceSignal. For example, the actual frequency domain bandwidth of the referenceSignal is an intersection between a frequency domain resource configured in the referenceSignal and a frequency domain bandwidth configured in the SCS-SpecificCarrier that is located in the SCS-SpecificCarrierList and that has the same subcarrier spacing as the referenceSignal. For example, in this case, the quasi co-location reference signal belongs to the reference signal included in the referenceSignalConfig in the MeasObject in Table 1. The MeasObject satisfies at least one of the following features: the MeasObject is a measObject corresponding to the servingCellMO configured in the serving cell; or such a MeasObject that a predetermined relationship is satisfied between the ARFCN-ValueNR configured in the serving cell and the ssbFrequency or refFreqCSI-RS of Table 1 corresponding to the measObject. For example, two ARFCN-ValueNRs are the same, a spacing between two ARFCN-ValueNRs is not greater than a predetermined value, or two ARFCN-ValueNRs belong to one frequency band.

In an example embodiment, in the case where the second-type parameter is the ARFCN-ValueNR, the frequency domain information of the referenceSignal is acquired according to the ARFCN-ValueNR. For example, the ARFCN-ValueNR is used as the frequency domain reference point A. For example, in this case, the quasi co-location reference signal belongs to the reference signal included in the referenceSignalConfig in the MeasObject in Table 1. In the case where the quasi co-location reference signal includes the SSB, the MeasObject is such a measObject that the ssbFrequency of Table 1 corresponding to the MeasObject is equal to the ARFCN-ValueNR configured in the second-type parameter. In the case where the quasi co-location reference signal includes the CSI-RS, the MeasObject is such a MeasObject that the refFreqCSI-RS of Table 1 corresponding to the MeasObject is equal to the ARFCN-ValueNR configured in the second-type parameter. For example, in this case, if multiple MeasObjects satisfy this condition, one MeasObject is selected according to a predetermined rule and/or signaling information. For example, a MeasObject that includes a CSI-RS index and that is the lowest or highest is selected, or it is predetermined that one ARFCN-ValueNR corresponds to one MeasObject.

In an example embodiment, if the PCI is configured, and the second-type parameter is not configured, the second-type parameter is, by default, a second-type parameter corresponding to the target serving cell in which the target signal is located. For example, the second-type parameter is a servCellIndex of the target serving cell, a MeasObjectID configured in the target serving cell, or an ARFCN-ValueNR configured in the target serving cell.

In an example embodiment, if the PCI is not configured, and the second-type parameter is the servCellIndex, the referenceSignal belongs to a reference signal configured in the serving cell corresponding to the servCellIndex, for example, a reference signal configured in the csi-measConfig configured in the ServingCellConfig. For example, if the referenceSignal is configured as SSB, the PhysCellId corresponding to the SSB is a PhysCellId corresponding to the serving cell corresponding to the servCellIndex, for example, a PhysCellId configured in the common control signaling (ServingCellConfigCommon) or a PhysCellId corresponding to an initially connected SSB. In the present application, the reference signal includes a CSI-RS and/or an SSB. In an example embodiment, in the case where the PCI is not configured, the PCI of the TCI state is PCI information configured in the serving cell common control signaling in which the target serving cell element is located, that is, PCI information configured in the serving cell common control signaling in which the TCI state list containing the TCI state is located.

The PCI and the second-type parameter are configured when the quasi co-location reference signal is configured. In the case where the second-type parameter is used for determining the frequency domain information of the quasi co-location reference signal, the quasi co-location reference signal does not necessarily belong to a measurement reference signal included in the MeasObject. For example, the quasi co-location reference signal belongs to a measurement reference signal of the PCI corresponding to the serving cell configuration information. In the case where the second-type parameter is used for determining the, easObject corresponding to the quasi co-location reference signal, the quasi co-location reference signal belongs to a measurement reference signal configured in the, easObject, for example, a measurement reference signal configured in the referenceSignalConfig in the MeasObject in Table 1, that is the measurement reference signalquasi co-location reference signal belongs to the mobility. For example, the quasi co-location reference signal is a reference signal corresponding to the PCI in the referenceSignalConfig. For example, in the case where the quasi co-location reference signal is the SSB, the SSB index belongs to an SSB index set selected by the ssb-ConfigMobility in the referenceSignalConfig in Table 2. In the case where the quasi co-location reference signal is the CSI-RS, the CSI-RS belongs to the CSI-RS corresponding to the PCI and configured in the referenceSignalConfig. That is, in Table 4, cellId is equal to the CSI-RS configured in the CSI-RS-CellMobility of the PCI. This is also the case with this embodiment. The quasi co-location reference signal belongs to a reference signal corresponding to one PCI in the MeasObject, but the quasi co-location reference signal is not used for mobility measurement. That is, the inter-cell mobility measurement result is not acquired according to the quasi co-location measurement reference signal. For example, two types of CSI-RSs are configured in the CSI-RS-CellMobility element in Table 4. One type of CSI-RS can be used for mobility measurement as well as for the quasi co-location reference signal. The other type of CSI-RS is not used for mobility measurement and is only used for one of the following of the information element in the serving cell: a quasi co-location reference signal, a reference signal in a spatial relationship, or a pathloss measurement reference signal.

In an example embodiment, the corresponding PCI and/or second-type parameter may be configured for the TCI state through an RRC signaling; or the corresponding PCI and/or second-type parameter may not be configured in the case where the TCI state is configured through an RRC signaling, and the corresponding PCI and/or second-type parameter is configured (or activated) for the TCI state in the case where the TCI state is activated through a MAC-CE signaling. The MAC-CE signaling may activate the corresponding PCI and/or second-type parameter for each TCI state, or the MAC-CE signaling may activate the corresponding PCI and/or second-type parameter for each TCI state group. For example, TCI states activated for a PDSCH in a BWP or BWP group constitute one TCI state group, one TCI state group shares one PCI and/or second-type parameter, or TCI states activated for a PDSCH corresponding to a CORESET group through a MAC-CE signaling constitute one TCI state group. The PDSCH corresponding to the CORESET group includes a PDSCH scheduled by a PDCCH in the CORESET group. Alternatively, a MAC-CE may configure a PCI and/or second-type parameter for a TCI state group composed of multiple TCI states corresponding to one codepoint. Similarly, an RRC signaling may configure a PCI and/or second-type parameter for each TCI state, or a PCI and/or second-type parameter may be configured for a TCI state group through a second-type parameter in an RRC signaling, that is, all TCI states in a TCI state group share one PCI and/or second-type parameter.

In an example embodiment, when a PCI and/or second-type parameter is configured for the quasi co-location reference signal, in the case where multiple quasi co-location reference signals are configured in one TCI state, and different quasi co-location reference signal correspond to different quasi co-location parameters, for example, different types among Type A~Type D, one of the manners below may be used.

In manner one, a PCI and/or second-type parameter is configured for each quasi co-location reference signal included in one TCI state, that is, a PCI and/or second-type parameter is configured in Table 8. In manner two, quasi co-location reference signals included in one TCI state share one PCI and/or second-type parameter, that is, a PCI and/or second-type parameter is configured in Table 7. In manner three, quasi co-location reference signals included in one TCI state share a second-type parameter, and each of the quasi co-location reference signals corresponds to one PCI. That is, a second-type parameter is configured in Table 7, and a PCI is configured in Table 8. In manner four, a PCI and/or second-type parameter is configured for each quasi co-location reference signal included in one TCI state, that is, a PCI and/or second-type parameter is configured in Table 8; and in the case where a PCI and/or second-type parameter for one quasi co-location reference signal in the one TCI state is not configured, a PCI and/or second-type parameter configured for another quasi co-location reference signal is used for determination.

In an example embodiment, in the case where a downlink reference signal is configured in a spatial relationship of an uplink element, a PCI and/or second-type parameter may also be configured. As described in Table 9, the frequency domain information of a spatial relationship reference signal in the spatial relationship and/or the MeasObject to which a spatial relationship reference signal in the spatial relationship belongs is determined according to a second-type parameter. The information element according to the present application includes a channel and/or a signal. A reference signal (that is, a spatial relationship reference signal) configured in the spatial relationship of an uplink element is a downlink reference signal or an uplink reference signal. In the case where a reference signal configured in the spatial relationship of an uplink element is a downlink reference signal, the spatial sending filter of the uplink element is determined according to the spatial receiving filter of the downlink reference signal. In the case where a reference signal configured in the spatial relationship of an uplink element is an uplink reference signal, the spatial sending filter of the uplink element is determined according to the spatial sending filter of the uplink reference signal.

TABLE 9

| SpatialRelationInfo | Configuration Content |
| --- | --- |
| PCI | PhysCellId |
| Second information | One of MeasObjectID, ServCellIndex, or ARFCN-ValueNR |
| referenceSignal | Spatial relationship reference signal index |

In an example embodiment, in the case where a PCI and/or second-type parameter is configured in the configuration of a pathloss reference signal of an uplink element, the frequency domain information corresponding to the pathloss reference signal and/or the MeasObject to which the pathloss reference signal belongs is determined according to the second-type parameter.

In an example embodiment, in the case where TA information is configured, a PCI and/or second-type parameter corresponding to the TA information is configured, that is, downlink timing corresponding to the TA information is determined according to the PCI and the second-type parameter. In this implementation, a PCI is directly configured in the configuration information of the target element or the configuration information of the third-type parameter corresponding to the target element, that is, the absolute value of the PCI is configured. If the range of the PCI is (0~1008), the PCI needs to be represented by 10 bits in the third-type parameter corresponding to each target element. In another implementation of this embodiment, a PCI list is configured for a serving cell. The PCI list includes one or more PCIs. The PCI list includes at most P PCIs. In this configuration information, the relative index of a PCI corresponding to the third-type parameter of the target element (or a PCI corresponding to the target element) in the PCI list is configured. In the case where the target element includes the information element, a third-type parameter corresponding to the target element includes at least one of the following parameters of the target element: a time domain parameter, a frequency domain parameter, a code domain parameter, a quasi co-location parameter, a spatial sending filter parameter, downlink timing, a power parameter, a MeasObject corresponding to the information element, or TA information.

For example, a second-type parameter and a PCI are included in the configuration of the third-type parameter corresponding to the information element. The information element is an information element in serving cell 1. A PCI list {PCI7, PCI18} is configured under serving cell1. The PCI list includes at most two PCIs (that is, P=2). In the configuration of the third-type parameter corresponding to the target element, 1 bit is used for configuration of a PCI corresponding to the configuration of the third-type parameter corresponding to the target element (or the target element). For example, the absolute value of the PCI in Table 8 is not represented using 10 bits. Rather, in Table 8, the relative index of the PCI corresponding to the TCI state in the PCI list is represented using 1 bit. In Table 9, the relative index of the PCI corresponding to the spatial relationship in the PCI list is also represented using 1 bit.

In an example embodiment, in a first configuration signaling, either a servCellIndex or a PhysCellId (referred to as PCI) is configured, and no second-type parameter is configured. The first configuration signaling includes one of the following: a configuration signaling of the third-type parameter corresponding to the target element; or a configuration signaling of the target element.

In the case where the configuration signaling includes a PCI, optionally, a PCI configured for a terminal satisfies one of the conditions below.

In condition one, PCIs configured in different MeasObjects are different. In condition two, PCIs configured in a referenceSignalConfig in one MeasObject are different. Here the PCI includes a PCI corresponding to an ssb-ConfigMobility and a PCI configured in a csi-rs-ResourceConfigMobility. In condition three, all PCIs configured for a terminal are different, including a PCI in a serving cell and a PCI in a MeasObject. In condition four, PCIs in a white cell list in all MeasObjects configured for a terminal are different. In condition five, PCIs of non-serving cells in all MeasObjects configured for a terminal are different. Non-serving cells are adjacent cells, including cells in a white cell list or cells outside a black cell list. In condition 6, PCIs allocated CSI-RSs in all MeasObjects configured for a terminal are different, that is, PCIs corresponding to CSI-RS-CellMobility elements included in different MeasObjects are different. In condition 7, PCIs configured in the common control signalings of different serving cells are different. This restriction is directed at a MeasObject or a serving cell in a frequency domain bandwidth or directed at a MeasObject or a serving cell in a frequency domain bandwidth group.

In the present application, the frequency domain bandwidth includes one of the following: a band, a serving cell, a BWP, or a PRB set.

Figure 3:
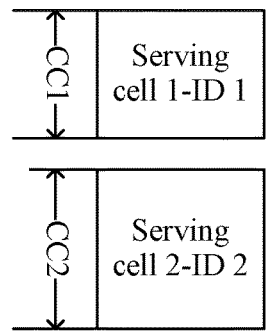
FIG. 3 is a diagram illustrating that different serving cells correspond to the same PCI value.
Figure 4:
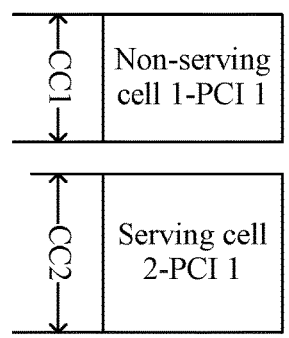
FIG. 4 is a diagram illustrating that a serving cell and a non-serving cell correspond to the same PCI value.

Under these constraint conditions, a quasi co-location reference signal can be uniquely determined even in the case where only a PCI is configured in a TCI state and no second-type parameter is configured in the TCI state. That is, the quasi co-location reference signal in Table 8 is a reference signal corresponding to the PCI. Otherwise, two identical PCIs are configured for a terminal in different serving cells or different MeasObjects, and a quasi co-location reference signal cannot be uniquely determined through only a PCI in a TCI state. When serving cells (or MeasObjects) located on two carriers are associated with the same PCI 1 as shown in FIG. 3 or when a MeasObject on CC1 and a MeasObject on CC2 are associated with the same PCI1 as shown in FIG. 4, in the case where PCIs 1 are configured in a TCI state, it cannot be determined a quasi co-location reference signal configured in the TCI state corresponds to which one of the two PCIs 1. The two PCIs 1 correspond to their respective reference signal sets. Reference signal indexes included in the respective reference signal sets may be the same. Parameters corresponding to two reference signals having the same index are configured independent of each other. That is, two reference signals having the same index are actually two reference signal resources independent of each other.

In an implementation of an embodiment, only a PCI is configured in the first configuration signaling, and a second-type parameter is not configured in the first configuration signaling.

In an example embodiment, in the case where PCI information is configured in the first configuration signaling, the configured PCI information satisfies one of the conditions below, where the PCI information includes an absolute PCI value or a relative PCI value.

In condition one, a PCI configured in the first configuration signaling does not intersect a PCI of a serving cell. This is because if a PCI configured in the first configuration signaling is the same as a PCI of a serving cell, configuration of a PCI is not required, and only configuration of a serving cell index is required.

In condition two, PCIs configured in the first configuration signaling belong to non-serving cells configured in one or more MeasObjects. For example, the non-serving cells include PCIs in a white cell list in the MeasObjects or include all PCIs outside a black cell list in the MeasObjects.

In condition three, a PCI configured in the first configuration signaling does not intersect a PCI of a serving cell where an information element of a target serving cell is located. Here a third-type parameter corresponding to the first configuration signaling is a third-type parameter of the information element of the target serving cell, and the information element of the target serving cell includes a channel of the target serving cell and/or a signal of the target serving cell.

In condition four, a PCI configured in the first signaling belongs to a predetermined PCI set configured in a predetermined MeasObject in a MeasConfig. Here the predetermined PCI set includes one of the following: a white cell list in the predetermined MeasObject; or all PCIs outside a black cell list in the predetermined MeasObject. Here frequency domain information configured in the predetermined MeasObject intersects the frequency domain bandwidth where the information element of the target serving cell is located. Alternatively, the frequency domain spacing between frequency domain information configured in the predetermined MeasObject and the frequency domain bandwidth where the information element of the target serving cell is located is not greater than a predetermined value. Alternatively, a serving cell where the information element of the target serving cell is located is associated with the predetermined MeasObject, that is, the MeasObject corresponding to the MeasObjectID configured in a serving cell where a target signal is located is the predetermined MeasObject.

In condition five, a PCI configured in the first configuration signaling does not belong to any serving cell and belongs to only a non-serving cell.

In condition six, a corresponding target element in the first configuration signaling belongs to a reference signal included in a referenceSignalConfig configured in a MeasObject associated with a PCI (or a PCI and a second-type parameter).

In an example embodiment, in the case where the first configuration signaling includes a configuration signaling of a target element, a PCI of the target element configured in the first configuration signaling may also satisfy the preceding features.

In an example embodiment, in the case where PCI information is configured in the configuration of a TCI state, the PCI information includes an absolute PCI value or a relative PCI value, and a quasi co-location reference signal (the referenceSignal included in the QCL-Info in Table 8) included in the TCI state is required to satisfy a predetermined condition, or a quasi co-location reference signal of associated Type A or Type B (that is, a first quasi co-location parameter set) is required to satisfy a predetermined condition. The predetermined condition includes at least one of the conditions below.

In condition one, a PCI and a servCellIndex are configured in the TCI state. That is, the second-type parameter in this embodiment is servCellIndex. This indicates that the frequency domain information of the referenceSignal is acquired according to the frequency domain information configured in the serving cell corresponding to the servCellIndex. For example, the frequency domain position of the referenceSignal belongs to the frequency domain bandwidth configured in the serving cell. For example, the servCellIndex corresponds to a serving cell where the information element of the serving cell is located. A quasi co-location relationship is satisfied between the information element of the serving cell and the referenceSignal. Alternatively, the MeasObject to which the quasi co-location reference signal belongs is determined according to the servCellIndex.

In condition two, it is required that the frequency domain resource of the referenceSignal intersects the frequency domain resource corresponding to the serving cell where the information element of the serving cell is located. A quasi co-location relationship is satisfied between the information element of the serving cell and the referenceSignal. For example, the quasi co-location information of the information element of the serving cell is configured as the TCI state. Alternatively, the serving cell where the information element of the serving cell is located is the serving cell for which the TCI state is configured.

In condition three, the frequency domain resource occupied by the referenceSignal is required to belong to the frequency domain resource corresponding to the serving cell where the information element of the serving cell is located.

In condition 4, the referenceSignal and the serving cell where the information element of the serving cell is located are required to be associated with the same MeasObjectID.

In condition five, the cell where the referenceSignal is located and the serving cell where the information element of the serving cell is located are required to be associated with the same MeasObjectID.

For example, in the case where the quasi co-location reference signal is associated with Type C or Type D, the PCI configured in the TCI state is not required to satisfy the preceding condition.

In an example embodiment, the PCI is configured in the first configuration signaling through the RRC signaling. In the case where the MAC-CE signaling activates the target element (or the third-type parameter corresponding to the target element) corresponding to the first configuration signaling for a serving cell, the activated PCI corresponding to the serving cell is determined, and then the MAC-CE signaling activates values of one or more target elements (or values of the third-type parameters corresponding to the target elements) in a set of values of the target elements (or a set of values of the third-type parameters corresponding to the target elements) corresponding to the activated PCI. For example, the RRC signaling configures 256 TCI states for a serving cell. Among the 256 TCI states, PCI 1 is configured in 128 TCI states, and PCI 2 is configured in the remaining 128 TCI states. In the case where the activated PCI of the serving cell is PCI 1, one or more of the 128 TCI states configured by the RRC signaling corresponding to PCI 1 are required to be selected in the signaling activating the TCI states. In the case where the activated PCI of the serving cell is PCI 2, one or more of the 128 TCI states configured by the RRC signaling corresponding to PCI 2 are required to be selected in the signaling activating the TCI states. For example, if the MAC-CE signaling activates the TCI states by using a bitmap, 128 bits in the MAC-CE signaling correspond to 128 TCI states corresponding to the activated PCI in the RRC signaling. That is, the TCI state set corresponding to the MAC-CE signaling is determined according to the activated PCI. Thus, the overhead of the MAC-CE signaling can be reduced effectively.

In an example embodiment, X PCIs are configured in a serving cell serving cell through the RRC signaling, and the MAC-CE signaling activates one PCI for the serving cell. Alternatively, when X is greater than 1, the MAC-CE activates one PCI for the serving cell.

For example, the parameter (that is, the third-type parameter) of the serving cell is acquired according to the activated PCI, the downlink timing of the information element of the serving cell is determined according to the SSB or CSI-RS corresponding to the activated PCI, and the reference signal associated with the information element of the serving cell belongs to the reference signal set corresponding to the activated PCI. Alternatively, the rate matching parameter of the PDSCH in the serving cell is the rate matching parameter corresponding to the activated PCI.

For example, wherein the PCI corresponding to the parameter of the serving cell is the activated PCI corresponding to the serving cell. Configuration of a PCI is not required in the configuration information of the parameter of the serving cell. The PCI is an activated PCI per serving cell, not a PCI configured or activated for the parameter value of each serving cell. Alternatively, it is not necessary to configure a corresponding PCI for the parameter value of each serving cell, but to configure a corresponding PCI for the parameter value of each serving cell group so that the PCI corresponding to the parameter of the serving cell is determined according to the activated PCI.

For example, the parameter of the serving cell includes the TCI state of the information element of the serving cell. Configuration of a PCI is not required in the TCI state. Only a serving cell index is configured in the TCI state. (A default serving cell is used when no serving cell index is configured.) In this case, the quasi co-location reference signal included in the TCI state is determined according to the PCI activated in the serving cell.

In the case where the quasi co-location reference signal is an SSB, the quasi co-location reference signal included in the TCI state is an SSB corresponding to the activated PCI. For example, assuming that serving cell 1 is configured in TCI state 1, and the quasi co-location reference signal of TCI state1 is SSB 1; in this case, SSB 1 of TCI state 1 is an SSB corresponding to PCI 1 when PCI 1 is activated in serving cell 1, and SSB 1 of TCI state 1 is an SSB corresponding to PCI 2 when PCI 2 is activated in serving cell 1. In the case where the quasi co-location reference signal is a CSI-RS, the quasi co-location reference signal is the reference signal corresponding to the activated PCI. For example, serving cell 1 is configured in TCI state1, and the quasi co-location reference signal of TCI state1 is CSI-RS1. In the case where PCI 1 is activated in serving cell 1, CSI-RS 1 of TCI state 1 corresponds to PCI 1. In the case where PCI 2 is activated in serving cell 1, CSI-RS 1 of TCI state 1 corresponds to PCI 2.

In this method, parameter values of the same serving cell are shared by multiple PCIs. For example, the same TCI state 1 is shared by multiple PCIs. The reference signal corresponding to an activated PCI may be determined in one of the manners below.

Figure 5:
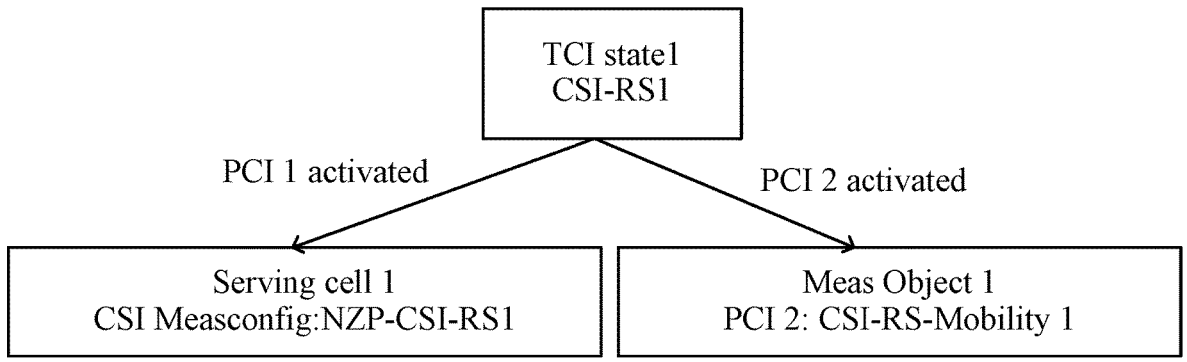
FIG. 5 is a diagram illustrating that quasi co-location reference signals corresponding to quasi co-location reference signal resource indexes in a TCI state are determined according to PCIs activated for the TCI state.

In manner one, as shown in FIG. 5, only the index CSI-RS 1 is configured in TCI state 1. In the case where the activated PCI is PCI 1 configured in the common control signaling of serving cell 1 and configured for the serving cell through the RRC signaling, the reference signal corresponding to PCI 1 is a reference signal configured in the serving cell. For example, CSI-RS 1 is a CSI-RS1 reference signal configured in the CSI-measConfig in serving cell 1. Otherwise, the reference signal corresponding to the PCI is a reference signal configured for the PCI in a MeasObject, for example, a mobility measurement reference signal configured in Table 4 and corresponding to a csi-RS-Index (described in Table 5) of 1.

Figure 6:
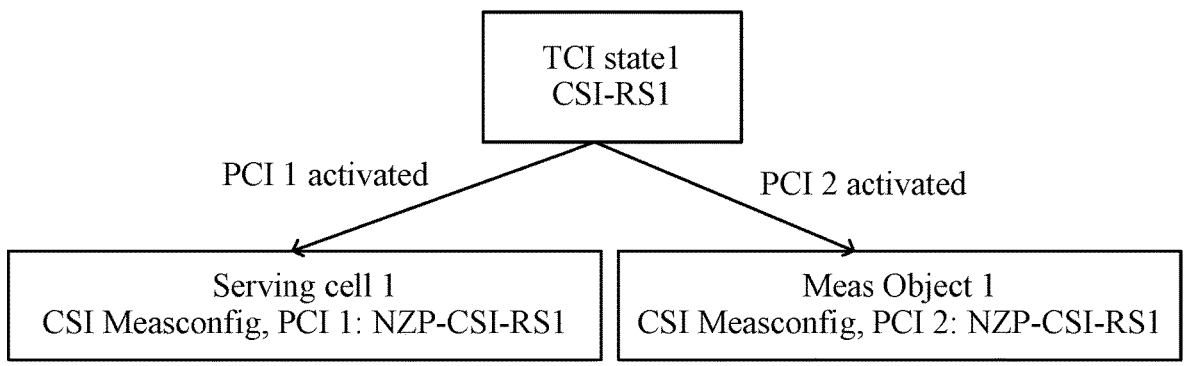
FIG. 6 is a diagram illustrating that corresponding reference signal sets are configured for different PCIs in a CSI-MeasConfig of a serving cell.

In manner two, a reference signal set corresponding to each PCI is configured in the serving cell, and reference signal indexes included in reference signal sets corresponding to different PCIs are numbered independent of each other. See FIG. 6.

Figure 7:
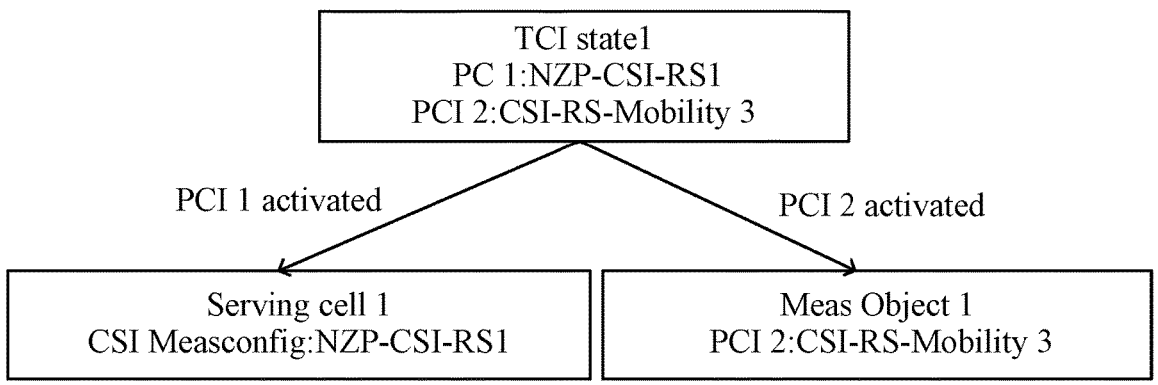
FIG. 7 is a diagram illustrating that a corresponding quasi co-location reference signal resource index is configured for each PCI in a TCI state.

In manner three, as shown in FIG. 7, a corresponding reference signal index is configured for each PCI in a TCI state. For example, a corresponding CSI-RS index is configured for each PCI in TCI state 1. The activated PCIs of serving cell 1 are different, and quasi co-location reference signal indexes corresponding to TCI state 1 may be different. For example, in the case where the activated PCI is a PCI configured in the common control signaling of serving cell 1 and configured for the serving cell through the RRC signaling, the reference signal corresponding in TCI state 1 is a reference signal configured in serving cell 1. For example, CSI-RS 1 is a CSI-RS1 reference signal configured in the CSI-MeasConfig in serving cell 1. Otherwise, the reference signal in TCI state 1 is a reference signal configured for the PCI in a MeasObject, for example, CSI-RS1 configured in Table 4.

In the preceding manner one and manner three, in the case where the activated PCI in serving cell 1 is not a PCI configured in the common control signaling of serving cell 1 and configured for the serving cell through the RRC signaling, it is required to determine the MeasObject corresponding to the PCI in the TCI state, for example, a MeasObject configured in serving cell 1; or determine a correspondence between serving cell 1 and the MeasObject through other signaling information or a predetermined rule.

Figure 8A:
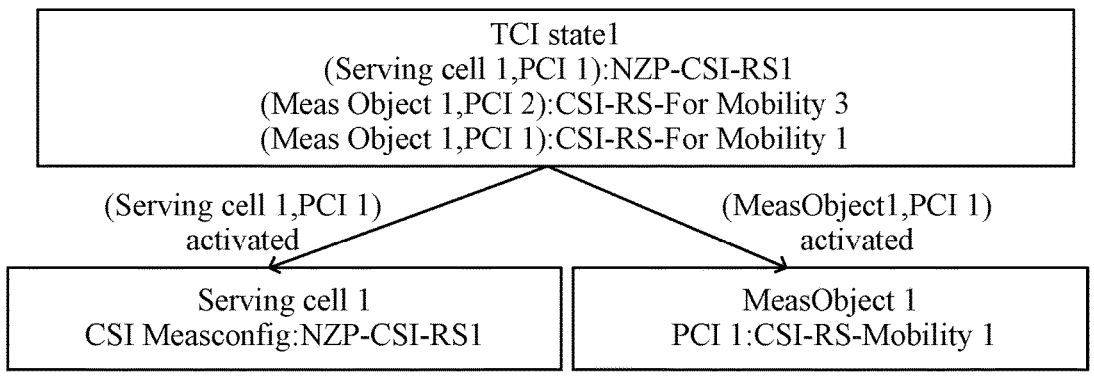
FIG. 8A is a diagram illustrating that a corresponding quasi co-location reference signal resource index is configured for each (PCI, second-type parameter) in a TCI state.

In manner four, the reference signal index corresponding to each combination of PCI and second-type parameter is configured in a TCI state, as shown in FIG. 8A, so that combinations of PCI and second-type parameter currently activated in a serving cell are different, and quasi co-location reference signal indexes in TCI state 1 and corresponding reference signals may be also different.

In manner five, in the case where the TCI state includes an SSB, the SSB in the TCI state corresponds to a changed PCI corresponding to the TCI state.

As shown in FIGS. 7 and 8A, different reference signal indexes are configured for different PCIs 1 (or combinations PCI and second-type parameter). In another implementation of this embodiment, the reference indexes in the TCI state are the same, except that some parameters of reference signals corresponding to different PCIs (or different combinations of PCI and second-type parameter) are different, that is, some parameters of reference signals in the same TCI state are shared, and some parameters are configured independently, for example, and reference signals in the TCI state.

Figure 8B:
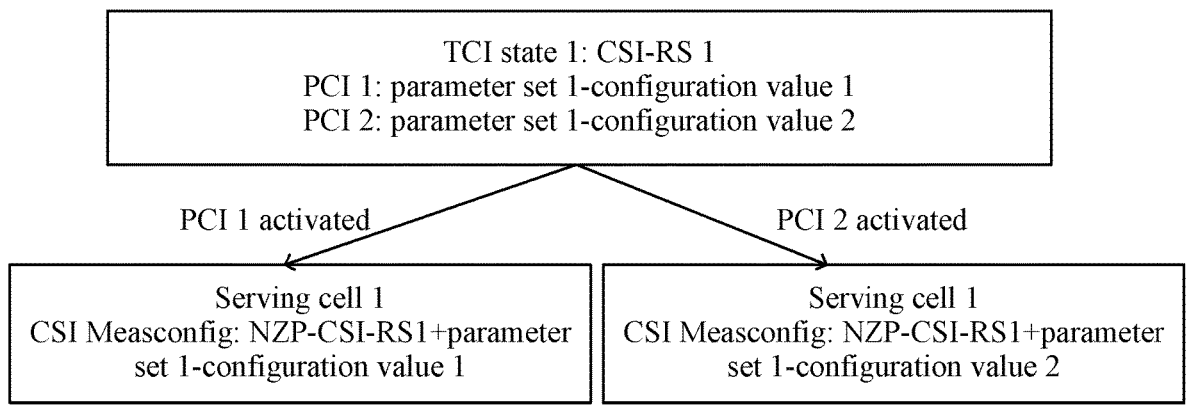
FIG. 8B is a diagram illustrating that a correspondence is established, in a TCI state, between a PCI or (PCI, second-type parameter) and parameter set 1 of a quasi co-location reference signal resource.

In manner six, as shown in FIG. 8B, the TCI state includes the reference signal index CSI-RS 1, and different values of parameter set 1 of CSI-RS 1 are configured, in the TCI state, for different PCIs so that when the activated PCIs are different, the TCI state corresponds to CSI-RS 1, except that parameter values in parameter set 1 of CSI-RS 1 are determined according to configuration values of parameter set 1 corresponding to the PCIs. The preceding describes an establishment of a correspondence in a TCI state and between a PCI and a configuration value of parameter set 1. A correspondence may also be established between a PCI and a configuration value of parameter set 1 when a CSI-RS1 measurement reference signal is configured.

Figure 8C:
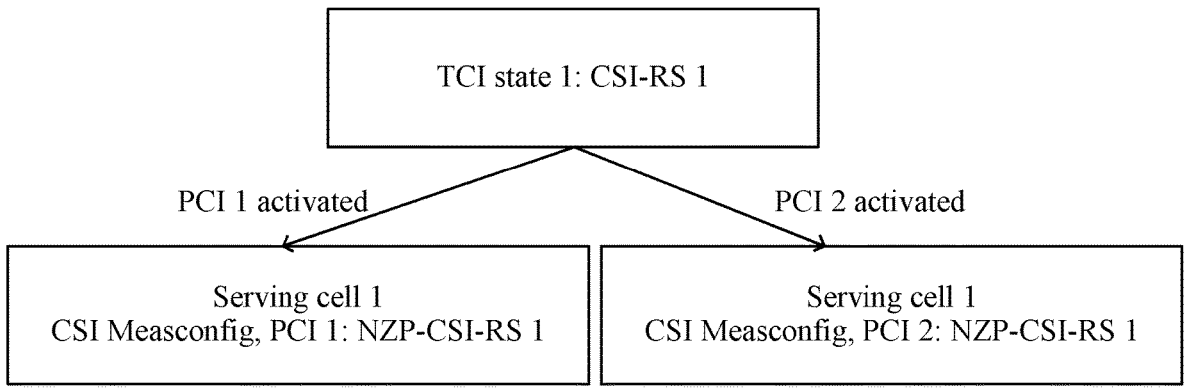
FIG. 8C is a diagram illustrating that one measurement reference signal resource index in a TCI state corresponds to different measurement reference signals according to different activated PCIs.

In manner 7, different PCIs correspond to the same measurement reference signal resource index, except that after a PCI is updated, a PCI corresponding to the measurement reference signal also changes. See FIG. 8C. For example, if a TCI state of the measurement reference signal includes an SSB, the SSB in the TCI state of the measurement reference signal is an SSB corresponding to the PCI corresponding to the measurement reference signal.

Similarly, it is not required to configure a PCI in spatial relationship information. After the PCI of the serving cell is updated, the reference signal in the spatial relationship information is the reference signal corresponding to the activated PCI. For example, when the reference signal in the spatial relationship information is an SSB, the SSB corresponds to the activated PCI in the serving cell; or when the reference signal in the spatial relationship information is a CSI-RS, the CSI-RS corresponds to the activated PCI in the serving cell.

Similarly, no PCI is required to be configured in the pathloss information. After a PCI is activated in a serving cell, a pathloss reference signal in the pathloss information is a reference signal corresponding to the activated PCI. For example, when the pathloss reference signal in the pathloss information is an SSB, the SSB corresponds to the activated PCI in the serving cell; or when the pathloss reference signal in the pathloss information is a CSI-RS, the CSI-RS corresponds to the activated PCI in the serving cell.

Similarly, it is not required to establish an association between a TA and a PCI. When a PCI is activated in a serving cell, the downlink timing of the TA is acquired according to the activated the PCI. For example, in this case, only one TAG-ID is required to be configured in the serving cell, and it is not required to configure a TAG-ID for each candidate PCI.

In an example embodiment, X PCIs are configured in a serving cell through an RRC signaling, and a MAC-CE signaling activates one PCI for the serving cell. Alternatively, when X is greater than 1, the MAC-CE signaling activates one PCI for the serving cell.

For example, a value of a parameter of the serving cell is acquired according to the activated PCI.

Optionally, a correspondence is established between X PCIs and Y values of the parameter (that is, the third-type parameter) of the serving cell. See Tables 10 and 11. Here Y is a positive integer greater than or equal to 1, or Y is a positive integer less than or equal to X. In the case where a PCI is activated in the serving cell, the value of the parameter of the serving cell corresponding to the PCI is activated. If Table 10 is established, the value of parameter a (that is, the parameter of the serving cell) is a first value when PCI 1 is activated, and the value of parameter a is a second value when PCI 2 is activated.

TABLE 10

| Serving cell | Value of parameter a |
|---|---|
| PCI1 | First value |
| PCI2 | Second value |

TABLE 11

| Serving cell | Value of parameter a |
|---|---|
| PCI1, PCI3 | First value |
| PCI2 | Second value |

For example, the parameter of serving cell includes a parameter of an information element in the serving cell. In the case where the downlink information element is a downlink information element, the parameter of the information element includes at least one of the following parameters of the information element: a channel scrambling sequence parameter; a rate matching parameter; a quasi co-location reference signal configuration parameter; a reference signal sequence parameter; or a parameter configured in the serving cell or BWP in an NR protocol and configured for a PDSCH, a CORESET, a search space, a CSI-RS, or an SSB. For example, after an activated PCI in a serving cell is updated, $N_{ID}^{cell}$ in a channel scrambling sequence in 211 or $N_{ID}^{cell}$ in generation of a reference signal sequence is updated to the activated PCI.

For example, in the case where the information element is an uplink information element, the parameter of the information element includes at least one of the following parameters: a channel scrambling parameter; a rate parameter; a power parameter; a channel multiplexing parameter; a TA parameter; or a parameter configured in the serving cell or BWP and configured for a PUSCH, a PUCCH, an SRS, or a PRACH. For example, in Table 10, a TAG-ID is configured for PCI 1 and PCI 2 separately, and the TAG-ID of the serving cell is determined according to the activated PCI. For example, when the parameter of the information element includes an information element group, a corresponding information element group is configured for each PCI (or PCI group). The information element group may be, for example, a CORESET group, a PUCCH group, or a reference signal group. An activated information element group is determined according to the activated PCI in the serving cell.

For example, the parameter of the information element includes an information element group, and different PCIs correspond to different reference signal groups. After the PCI is activated, the reference signal group corresponding to the PCI is also activated. Reference signal indexes in reference signal groups corresponding to different PCIs may be numbered independent of each other. That is, reference signal groups corresponding to different PCIs may include identically indexed reference signal resources that may correspond to different parameters. In this manner, one quasi co-location reference signal index, for example, CSI-RS 1, is configured in one TCI state. CSI-RS 1 is in a reference signal group corresponding to PCI 1. CSI-RS 2 is in a reference signal group corresponding to PCI 2.

Before a MAC-CE activation signaling is received or between RRC signaling reconfiguration and receiving of a MAC-CE signaling, a default PCI is used as the activated PCI of a serving cell. The default PCI may be, for example, a first PCI, a PCI configured for the serving cell by a common control signaling, or a PCI selected at the initial access. Here the RRC signaling configures X PCIs for one serving cell, and one of the PCIs is activated through a MAC-CE signaling. In this embodiment, the RRC signaling may also configure X combination values of PCI and second-type parameter, and one of the combination values is activated through a MAC-CE signaling. For example, the second-type parameter includes at least one of the following: a frequency domain parameter, a slot structure parameter, a subcarrier spacing, a MeasObjectID, a MeasID, a serving cell index, a MeasConfigID, cell group information, or a ARFCN-ValueNR.

In an example embodiment, multiple PCIs are configured in one serving cell through a RRC signaling. Each of the PCIs corresponds to one configuration value of a third-type parameter of a target element. The third-type parameter includes at least one of the following parameters: a downlink common configuration (DownlinkConfigCommon, for configuration of the initial BWP and a frequency domain position of the serving cell); frequency information (frequencyInfoDL, for configuration of a frequency domain position of the serving cell); SSB burst position (ssb-PositionsInBurst, for indicating an SSB index transmitted by a base station); an SSB period serving cell (ssb-periodicityServingCell, for indicating the period of an SSB); or SSB extended physical broadcast channel (PBCH)-block power (ssb-PBCH-BlockPower, for indicating the transmit power of an SSB). In this manner, different PCIs correspond to different values of these parameters.

Alternatively, the values of the multiple PCIs correspond to the same value of the third-type parameter. For example, SSBs corresponding to the multiple PCIs associated with the one serving cell are the same in terms of at least one of the following parameters: a central carrier, a subcarrier spacing, or an SSB index pattern transmitted in one burst.

In an example embodiment, PCI information corresponding to a reference signal is determined according to a sequence parameter of the reference signal. For example, a demodulation reference signal (DMRS) corresponds to a pseudo-random sequence. The sequence generation parameter of the DMRS includes a virtual cell identifier parameter. The PCI of a quasi co-location reference signal included in a TCI state of the DMRS may be determined according to $N_{ID}^{nSCID}$. Alternatively, PCI information of a tracking reference signal (TRS) is determined according to a cell serialization parameter $n_{ID}$ in a sequence generation parameter of the TRS. In the case where a PCI of the TRS is PCI 1, an SSB in a TCI state of the TRS corresponds to PCI 1. In the case where a PCI of the TRS is PCI 2, an SSB in a TCI state of the TRS corresponds to PCI 2.

Similarly, PCI information corresponding to a channel or a PCI corresponding to a reference signal associated with a channel may also be determined according to a scrambling sequence parameter of the channel.

In an example embodiment, a correspondence is established between a CORESET group and a PCI through signaling information, and a PCI referenced by a CORESET-scheduled information element in the CORESET group is a PCI corresponding to the CORESET group, or a PCI corresponding to an information element scheduled by a PDCCH in the CORESET group is a PCI corresponding to the CORESET group.

For example, the downlink timing of the information element scheduled by the PDCCH in the CORESET group is obtained according to the PCI corresponding to the CORESET group, that is, according to an SSB corresponding to the CORESET group. Alternatively, a reference signal corresponding to a third-type parameter of the information element scheduled by the PDCCH in the CORESET group is a reference signal corresponding to the PCI corresponding to the CORESET group.

Optionally, the correspondence between the CORESET group (or CORESET) and the PCI may be established in one of the manners below.

In manner one, a correspondence is established between C CORESE groups (or C CORESETs) and D PCIs through an RRC signaling. Here C and D are positive integers greater than or equal to 1, and one PCI is configured for one CORESET group (or one CORESET).

In manner two, more than one PCI is configured for each CORESET group (or CORESET) through an RRC signaling, and one PCI is activated for each CORESET group (or CORESET) through a MAC-CE.

In manner three, one TCI state is configured or activated for each CORESET through an RRC or a MAC-CE, that is, a quasi co-location relationship is satisfied between a DMRS of the CORESET and a reference signal indicated in the TCI state, and the TCI state includes PCI information, so that it is determined that a PCI corresponding to the CORESET is the PCI information in the TCI state of the CORSET. A PCI corresponding to a TCI state of an aperiodic (AP)-CSI-RS or a PDSCH scheduled in a PDCCH in the CORESET is the PCI corresponding to the CORESET. In this case, it is feasible to configure no PCI in the configuration of the TCI state of the AP-CSI-RS or the PDSCH. Alternatively, if the TCI state of the AP-CSI-RS or the PDSCH includes a PCI, the PCI in the TCI state of the AP-CSI-RS or the PDSCH is used as the PCI of the AP-CSI-RS or the PDSCH, and if the TCI state of the AP-CSI-RS or the PDSCH includes no PCI, the PCI of the CORESET is used as the PCI of the AP-CSI-RS or the PDSCH, that is, used as the PCI corresponding to the TCI state of the AP-CSI-RS or the PDSCH.

In manner four, one TCI state is configured or activated for each CORESET through an RRC or MAC-CE signaling, that is, a quasi co-location relationship is satisfied between a DMRS of the CORESET and a reference signal indicated in the TCI state, and the TCI state includes PCI information, so that it is determined that a PCI corresponding to the CORESET is the PCI information in the TCI state of the CORSET. When a CORESET group includes multiple CORESETs, a PCI corresponding to the CORESET group is determined according to a PCI included in a TCI state of a CORESET in the CORESET group. For example, a PCI corresponding to a CORESET group is determined according to a PCI in a TCI state of a CORESET having the highest (or lowest) index in the CORESET group. Alternatively, a PCI corresponding to a CORESET group is determined according to a PCI in a TCI state of a CORESET satisfying a predetermined feature among CORESETs configured with TCI states in the CORESET group. A PCI corresponding to a TCI state of an AP-CSI-RS or a PDSCH scheduled in a PDCCH in the CORESET group is the PCI corresponding to the CORESET group. In this case, it is feasible to configure no PCI in the configuration of the TCI state of the AP-CSI-RS or the PDSCH. Alternatively, if the TCI state of the AP-CSI-RS or the PDSCH includes a PCI, the PCI in the TCI state of the AP-CSI-RS or the PDSCH is used as the PCI of the AP-CSI-RS or the PDSCH, and if the TCI state of the AP-CSI-RS or the PDSCH includes no PCI, the PCI of the CORESET group is used as the PCI of the AP-CSI-RS or the PDSCH, that is, used as the PCI corresponding to the TCI state of the AP-CSI-RS or the PDSCH. For example, all CORESETs in a CORESET group are required to correspond to the same PCI information. For example, TCI states of all CORESETs in a CORESET group correspond to the same PCI information.

In the preceding manners, PCI information corresponding to an AP-CSI-RS or a PDSCH scheduled in a CORESET group (or CORESET) is determined according to a PCI corresponding to the CORESET group (or CORESET), and a PCI corresponding to a periodic or semi-persistent channel or signal is determined according to at least one of the following:

A. The PCI corresponding to the periodic or semi-persistent channel or signal is determined, by default, according to a PCI corresponding to CORESET group 0 (CORESET).

B. The PCI corresponding to the periodic or semi-persistent channel or signal is determined according to a PCI corresponding to a CORESET group (or CORESET) having a CORESET group index (or CORESET index) configured in the periodic signal resource or semi-persistent channel or signal resource.

C. The PCI corresponding to the periodic or semi-persistent channel or signal is determined according to a PCI corresponding to a CORESET group including a CORESET scheduling a PDSCH (or a CORESET scheduling a PDSCH). Here the PDSCH includes an RRC or MAC-CE signaling that includes a periodic or semi-persistent channel configuration signaling.

D. The PCI corresponding to the periodic or semi-persistent channel or signal is determined according to a PCI corresponding to a CORESET group having an index included in a TCI state of the periodic or semi-persistent information element.

E. When a periodic CSI-RS is TRS, one periodic TRS corresponds to one aperiodic TRS, a PCI of the periodic TRS is a PCI corresponding to the aperiodic TRS, and the PCI corresponding to the aperiodic TRS is determined according to a PCI corresponding to a CORESET group (or CORESET) scheduling the aperiodic TRS.

The preceding describes the establishment of a correspondence between a CORESET group and a PCI. A correspondence may also be established between a CORESET group and a (PCI, second-type parameter) combination value. The second-type parameter includes at least one of the following: a frequency domain parameter, a slot structure parameter, a subcarrier spacing, a MeasObject, a MeasID, a serving cell index, a MeasConfigID, cell group information, or an ARFCN-ValueNR. A (PCI, second-type parameter) combination value corresponding to an information element associated with the CORESET group is determined according to the (PCI, second-type parameter) combination value corresponding to the CORESET group.

In an example embodiment, in the case where a PCI is configured, the absolute value of the PCI may be configured. For example, the range of the PCI is 0 to 1008. 10 bits are required for configuration of the PCI. In another example embodiment, the relative value of the PCI may be configured. For example, the PCI may be a relative value of multiple PCIs associated with a serving cell or a relative value of a white cell list in a MeasObject.

For example, the multiple PCIs associated with the serving cell may be multiple PCIs configured for one serving cell through an RRC signaling. For example, the RRC signaling configures a maximum of eight PCIs for one serving cell. In a first signaling, only three bits are used for indicating a PCI corresponding to a target element or a PCI corresponding to a third-type parameter of a target element. A relative index among the multiple PCIs is configured in one serving cell.

For example, the multiple PCIs associated with the serving cell may be multiple PCIs activated for one serving cell through a MAC-CE signaling. For example, if the MAC-CE signaling activates a maximum of two PCIs for one serving cell, then in the first signaling, only one bit is used for indication, where the bit value 0 indicates a first PCI activated by the MAC-CE signaling, and the bit value 1 indicates a second PCI activated by the MAC-CE signaling.

Figure 9:
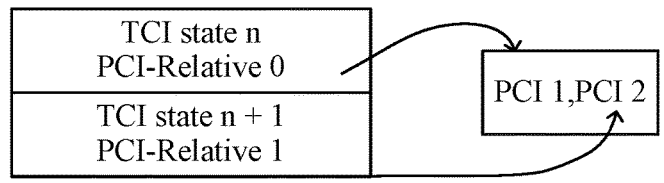
FIG. 9 is a diagram illustrating that a PCI relative value is configured in a TCI state, where the relative value is included in an activated PCI list.
Figure 10:
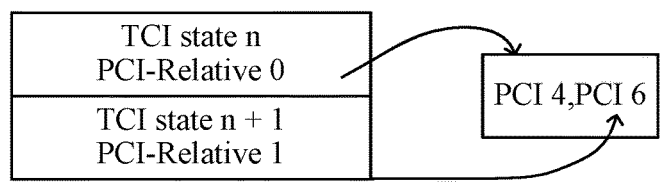
FIG. 10 is a diagram illustrating that a PCI relative value is configured in a TCI state, where the relative value is included in an activated PCI list.

As shown in FIGS. 9 and 10, PCI relative value 0 is configured for TCI state n of serving cell 1, and PCI relative value 1 is configured for TCI state n+1 of serving cell 1. As shown in FIG. 9, when a PCI set activated or configured for serving cell 1 through a MAC-CE and/or RRC signaling is {PCI 1, PCI 2}, the corresponding PCI absolute value in TCI state n is PCI 1, and the corresponding PCI absolute value in TCI state n+1 is PCI 2. As shown in FIG. 10, when a PCI set activated or configured for serving cell 1 through a MAC-CE and/or RRC signaling is {PCI 4, PCI 6}, the corresponding PCI absolute value in TCI state n+1 is PCI 4, and the corresponding PCI absolute value in TCI state n+1 is PCI 6. In this case, the same TCI state configured through the RRC signaling is shared among multiple PCIs. For example, TCI state n is shared among {PCI 1, PCI 4}. A reference signal corresponding to a quasi co-location reference signal index in TCI state n may be determined in the manners shown in FIGS. 5 to 8.

TCI states having the same relative index may also be referred to as a TCI state group. For example, TCI states having a relative index of 0 constitute TCI state group 0. For example, TCI states having a relative index of 1 constitute TCI state group 1. Each TCI state group may be allocated a corresponding absolute PCI through a MAC-CE signaling. In this case, a PCI relative index in the TCI state may also be directly referred to as TCI state index information.

Alternatively, a correspondence is established between a CORESET group and a TCI state group.

In an example embodiment, multiple PCIs are configured for a serving cell through an RRC signaling. One of the multiple PCIs is configured in the serving cell common control signaling (ServingCellConfigcommon) of the serving cell. Other PCIs of the multiple PCIs are configured in the serving cell dedicated control signaling (ServingCellConfig) of the serving cell.

For example, a PCI configured in the ServingCellConfigcommon may be referred to as a primary PCI, and a PCI configured in the ServingCellConfig may be referred to as a secondary PCI. Here some parameters among first-type parameters corresponding to a target element of the serving cell are determined according to only the primary PCI, and some parameters among first-type parameters corresponding to a target element of the serving cell are determined according to both the primary PCI and the secondary PCI.

For example, a MAC-CE signaling may update the primary PCI.

For example, a MAC-CE signaling may activate or deactivate one secondary PCI.

Figure 11:
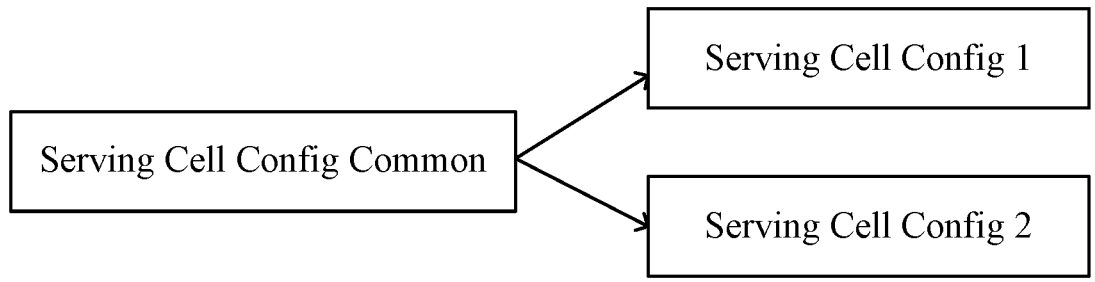
FIG. 11 is a diagram illustrating that one common serving cell configuration signaling corresponds to multiple dedicated serving cell signalings (ServingCellConfigs).
Figure 12:
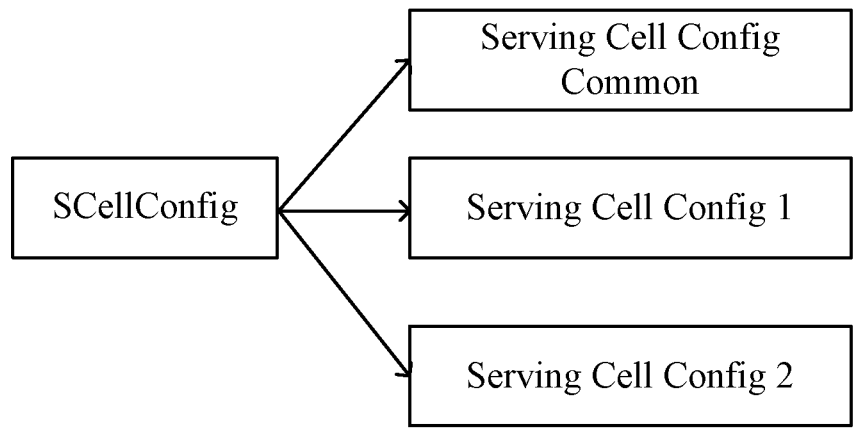
FIG. 12 is a diagram illustrating that one serving cell corresponds to one common serving cell control signaling and multiple dedicated serving cell signalings (ServingCellConfigs).

In an example embodiment, one ServingCellConfigcommom is associated with multiple ServingCellConfigs. See FIG. 11. That is, one serving cell corresponds to one ServingCellConfigcommom and multiple ServingCellConfigs. See FIG. 12.

Figure 13:
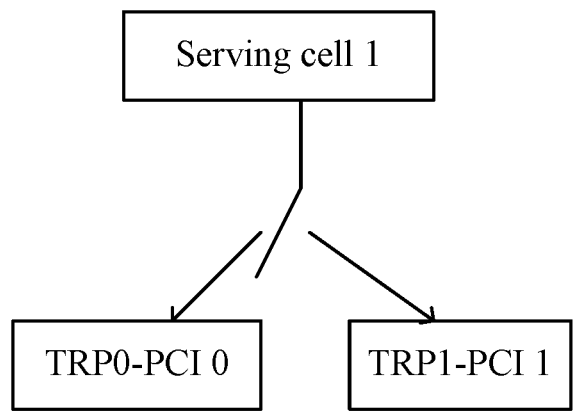
FIG. 13 is a diagram illustrating that only one of the multiple dedicated serving cell signalings (ServingCellConfigs) corresponding to one serving cell are in an activated state.
Figure 14:
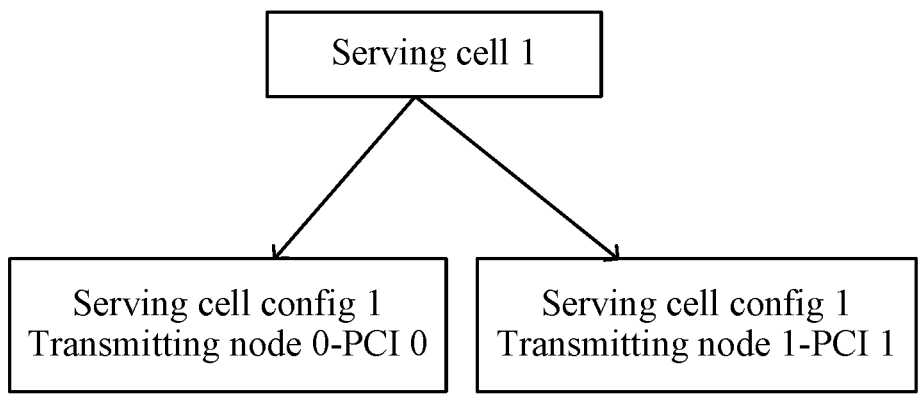
FIG. 14 is a diagram illustrating that only two of the multiple dedicated serving cell signalings (ServingCellConfigs) corresponding to one serving cell are in an activated state.

For example, the ServingCellConfigcommom in the serving cell is always in an active state while only one of the multiple ServingCellConfigs of serving cell is in an active state. See FIG. 13. Alternatively, only two of the multiple ServingCellConfigs of the serving cell is in an active state. See FIG. 14. For example, one ServingConfig corresponds to one transmitting node and one PCI. For example, one PCI may be configured in each ServingCellConfig, or a PCI and a second-type parameter may be configured in each ServingCellConfig.

In an example embodiment, the measurement of a reference signal corresponding to a PCI activated through a MAC-CE signaling is no longer limited by a measurement gap. For example, before a PCI is activated, a reference signal corresponding to the PCI can be measured only in a measurement gap, and after the PCI is activated, the measurement of the reference signal corresponding to the PCI can be measured outside the measurement gap without being limited by the measurement gap. The reference signal corresponding to the PCI includes at least one of the following: a reference signal configured for the PCI in one MeasObject; a reference signal configured for the PCI in a serving cell; or a reference signal corresponding to the PCI in an activated TCI state. Here the activated TCI state includes a TCI state of a CORESET, a TCI state of a periodic channel and/or signal, a TCI state of an activated semi-persistent channel and/or signal, or a TCI state of an activated PDSCH.

Similarly, after a PCI is activated by a MAC-CE signaling, the measurement of an SSB corresponding to the PCI is no longer limited by synchronization signal/physical broadcast channel block (SSB) measurement timing configuration. For example, before the PCI is activated, an SSB corresponding to the PCI can be measured only in an SMTC window, or a terminal assumes that a base station transmits the SSB corresponding to the PCI only in the SMTC window; and after the PCI is activated, the SSB corresponding to the PCI can be measured in the SMTC window, or the terminal assumes that the base station also transmits the SSB corresponding to the PCI in the period of the SSB outside the SMTC window. Similarly, after a PCI is activated through a MAC-CE signaling, a resource occupied by a reference signal corresponding to the PCI is an unavailable resource of a PDSCH; and before the MAC-CE, the resource occupied by the reference signal corresponding to the PCI is an available resource of the PDSCH.

In an example embodiment, SMTC information is configured by a MAC-CE signaling, and MeasObject information corresponding to the SMTC is also included in the MAC-CE, indicating that the SMTC is applicable to all MeasObjects.

In an example embodiment, more than one PCI is activated in a serving cell in a time period, but on one time domain symbol, sending or receiving is allowed for a serving cell element corresponding to only one PCI. In this case, it is specified that serving cell elements on the same time domain symbol are associated with the same PCI when a base station configures, for a terminal, an information element in the serving cell.

Alternatively, if the base station allows allocation of information elements corresponding to the different PCIs to the same time domain symbol, it is required to specify priority levels of the information elements corresponding to the different PCIs, for example, specify that only information elements corresponding to PCIs with higher priority levels can be transmitted or received. Each information element may be a channel or signal in the serving cell.

In an example embodiment, when PCI information is configured in a BWP, SSB information corresponding to the PCI is configured. For example, time domain selection information of the SSB, frequency domain information of the SSB, and period information of the SSB are configured. After the BWP is activated, a PCI corresponding to a channel or signal in the BWP is a PCI in the BWP. The PCI corresponding to the channel or signal is the PCI in the BWP in one of the following manners: The PCI corresponding to the parameter of the channel or signal is the PCI. In the case where the signal is an SSB, the sequence of the SSB is obtained according to the PCI. For example, no PCI information is configured in a TCI state. The PCI information of the TCI state is the PCI of the BWP for which the TCI state is configured, or the PCI information of the TCI state is the PCI of the BWP where the target element is located. The same goes to a parameter of a synchronization signal in the BWP.

For example, there are two BWPs in a serving cell, and different PCIs are configured for the two BWPs. Alternatively, a PCI corresponding to a BWP for which no PCI is configured in a serving cell is a PCI configured in a ServingCellConfigcommon, and a PCI configured for a BWP is a PCI configured in the BWP.

For example, two BWPs may be activated simultaneously in one serving cell, and the two BWPs may have different PCI information. For example, the two BWPs have the same center carrier.

Similarly, a PCI and a second-type parameter may also be configured for the BWP.

Figure 15:
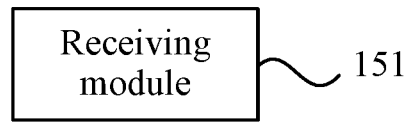
FIG. 15 is a block diagram of a signaling receiving apparatus according to the present application.

FIG. 15 is a block diagram of a signaling receiving apparatus according to the present application. As shown in FIG. 15, the apparatus according to the present application includes a receiving module 151.

The receiving module 151 is configured to receive a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

In an example embodiment, the apparatus according to the present application also includes a determination module. The determination module is configured to determine, according to the first-type parameter corresponding to the target element, a first-type parameter corresponding to the information element associated with the target element.

In an example embodiment, in the case where the target element includes a control resource set (CORESET) or a CORESET group, the information element associated with the target element includes at least one of the following: an information element scheduled by a physical downlink control channel (PDCCH) in the target element; an information element in a physical downlink shared channel (PDSCH) scheduled by a PDCCH whose scheduling signaling is included in the target element; an information element associated with the target element and determined according to a second signaling, where the second signaling includes an association between the information element and the target element; or an information element associated with the target element and determined according to a second predetermined rule. The second signaling is a signaling transmitted by a base station and received by a terminal. The second predetermined rule may be configured according to requirements.

In an example embodiment, the information element associated with the target element is determined according to the second predetermined rule in one of the following manners: An association exists between a periodic or semi-persistent information element and a pre-indexed target element; or a first-type parameter corresponding to a periodic or semi-persistent information element is acquired according to a first-type parameter corresponding to a non-periodic information element, where the first-type parameter corresponding to the non-periodic information element is acquired according to a first-type parameter corresponding to a target element in which a PDCCH scheduling the non-periodic element is located.

In an example embodiment, determining, according to the first-type parameter corresponding to the target element, the first-type parameter corresponding to the information element associated with the target element includes determining, according to the first-type parameter corresponding to the target element, a first-type parameter corresponding to a third-type parameter of the information element associated with the target element.

In an example embodiment, in the case where the target element includes the information element, the information element associated with the target element includes at least one of the following: a quasi co-location reference signal of the target element; a reference signal in spatial relationship information of the target element; a pathloss reference signal of the target element; or an information element, where an association exists between the information element and the target element.

In an example embodiment, in the case where the target element includes the serving cell or the BWP, the information element associated with the target element includes an information element located in the target element.

In an example embodiment, determining, according to the first-type parameter corresponding to the target element, the first-type parameter corresponding to the information element associated with the target element includes determining a first-type parameter corresponding to a periodic or semi-persistent information element according to a first-type parameter corresponding to a non-periodic information element, where an association exists between the periodic or semi-persistent information element and the non-periodic information element.

In an example embodiment, in the case where the target element includes the TCI state, and the information element associated with the target element includes a quasi co-location reference signal in the TCI state, the determination module is also configured to perform one of the following: determining a reference signal resource corresponding to a quasi co-location reference signal index according to the quasi co-location reference signal index in the TCI state and the first-type parameter; or determining a parameter of a reference signal resource corresponding to a quasi co-location reference signal index according to the quasi co-location reference signal index in the TCI state and the first-type parameter.

With regard to the same quasi co-location reference signal index in the same TCI state, different first-type parameters each correspond to one quasi co-location reference signal resource. With regard to the same quasi co-location reference signal index in the same TCI state, different first-type parameters each correspond to one value of the parameter of the quasi co-location reference signal resource.

In an example embodiment, in the case where the target element includes a group, the group includes one of the following: the information element group, the TCI state group, the serving cell group, or the BWP group; and the first signaling includes the first-type parameter corresponding to the target element in one of the following manners: The first signaling includes a first-type parameter corresponding to the group, where elements in the group correspond to the same first-type parameter; or the first signaling includes a first-type parameter corresponding to an element in the group, where elements in the group correspond to the same first-type parameter.

In an example embodiment, the first signaling includes the first-type parameter corresponding to the target element and a second-type parameter corresponding to the target element. The second-type parameter includes at least one of the following: a frequency domain parameter, a slot structure parameter, a subcarrier spacing, a measurement object identifier (MeasObjectID), a measurement identifier (MeasId), a serving cell index, a measurement configuration identifier (MeasConfigId), cell group information, or an absolute radio-frequency channel number-ValueNR (ARFCN-ValueNR). One MeasID includes one MeasObjectID and one report configuration identifier (reportConfigId).

In an example embodiment, the determination module is also configured to determine at least one of the following information of the target element according to the second-type parameter: a frequency domain bandwidth, a frequency domain reference point A, or a MeasObject to which the target element belongs.

In an example embodiment, the determination module is also configured to determine a third-type parameter corresponding to the target element according to the first-type parameter corresponding to the target element.

In an example embodiment, the determination module is also configured to perform at least one of the following: determine the third-type parameter corresponding to the target element according to the first-type parameter and the second-type parameter corresponding to the target element; or determine the first-type parameter and the second-type parameter of the information element corresponding to the target element according to the first-type parameter and the second-type parameter corresponding to the target element.

In an example embodiment, determining, according to the first-type parameter corresponding to the target element, the third-type parameter corresponding to the target element includes determining a mapping between A values of the first-type parameter and B values of the third-type parameter corresponding to the target element. A is a positive integer greater than or equal to 1, and B is a positive integer less than or equal to A. A mapping between A values of the first-type parameter and B values of the third-type parameter corresponding to the target element may be determined according to signaling information or a predetermined rule.

In an example embodiment, determining the third-type parameter corresponding to the target element according to the first-type parameter corresponding to the target element and the second-type parameter corresponding to the target element includes determining a mapping between C combination values of the first-type parameter and the second-type parameter and D values of the third-type parameter corresponding to the target element. C is a positive integer greater than or equal to 1, and D is a positive integer less than or equal to C.

In an example embodiment, in the case where the target element includes the information element, and the first-type parameter includes the mobility measurement reference signal, the first signaling includes a mobility measurement reference signal corresponding to the information element. The first signaling includes at least one of the following: a configuration signaling of a quasi co-location reference signal of the information element; a configuration signaling of a spatial relationship of the information element; a configuration signaling of a pathloss reference signal of the information element; a configuration signaling of downlink timing of the information element; or a configuration signaling of a timing advance (TA) of the information element.

In an example embodiment, in the case where the target element includes the information element, and the first-type parameter includes the mobility measurement reference signal, the first signaling includes the mobility measurement reference signal corresponding to the information element in the following manner: The first signaling includes at least one of the following corresponding to the mobility measurement reference signal: a physical cell identifier, a MeasObjectID, a MeasConfigID, cell group information, or a resource index of the mobility measurement reference signal.

In an example embodiment, in the case where the mobility measurement reference signal includes a synchronization signal, a synchronization signal index corresponding to the mobility measurement reference signal belongs to a synchronization signal time domain index set selected from a MeasObject corresponding to the MeasObjectID. In an example embodiment, a synchronization signal time domain index corresponding to the mobility measurement reference signal belongs to a synchronization signal time domain index set selected from a MeasObject.

In an example embodiment, the first-type parameter or a MeasObject to which the target element belongs includes at least one of the following: a MeasObject corresponding to a serving cell measurement object (servingCellMO) in a serving cell in which the target element is located; a MeasObject whose frequency domain information satisfies a first predetermined condition and that corresponds to a target element whose serving cell has frequency domain information that satisfies the first predetermined condition; a measObject whose frequency domain information satisfies a second predetermined condition and that corresponds to a first-type parameter whose frequency domain information satisfies the second predetermined condition; or a MeasObject whose frequency domain information satisfies a third predetermined condition and that corresponds to a target element whose frequency domain information satisfies the third predetermined condition.

In an example embodiment, the first-type parameter or a MeasObject to which the target element belongs includes a MeasConfig corresponding to a cell group in which the target element is located.

In an example embodiment, the information element includes at least one of the following: a quasi co-location reference signal, a pathloss reference signal, a reference signal included in a spatial relationship, a CORESET, an information element in a serving cell, a data channel, a control channel, a reference signal, a synchronization signal, or a random access signal.

In an example embodiment, the first signaling includes at least one of the following: a radio resource control (RRC) signaling or a medium access control-control element (MAC-CE) signaling.

In an example embodiment, the first signaling includes the first-type parameter corresponding to the target element in the following manner: X values of the first-type parameter are configured, in an RRC signaling, for the target element, where X is a positive integer greater than or equal to 1.

In an example embodiment, in the case where the X values of the first-type parameter are configured, in the RRC signaling, for the target element, the following is also included: activating, for the target element, Y values among the X values of the first-type parameter through a MAC-CE signaling. Y is a positive integer less than or equal to X.

In an example embodiment, in the case where the target element includes the serving cell, the X values of the first-type parameter are configured, in the RRC signaling, for the target element in at least one of the following manners: One value of the first-type parameter is configured, in a common control signaling of the serving cell, for the serving cell; or at least one value of the first-type parameter is configured, in a dedicated control signaling of the serving cell, for the serving cell.

In an example embodiment, the first signaling includes the first-type parameter corresponding to the target element and the second-type parameter corresponding to the target element in the following manner: E combination values are configured, in an RRC signaling, for the target element. E is a positive integer greater than or equal to 1. The combination values are combination values of the first-type parameter and the second-type parameter.

In an example embodiment, the first signaling includes the first-type parameter corresponding to the target element and the second-type parameter corresponding to the target element also in the following manner: A MAC-CE signaling activates, for the target element, F combination values among the E combination values. F is a positive integer less than or equal to E.

In an example embodiment, in the case where the target element includes the serving cell, a third-type parameter corresponding to the target element includes at least one of the following: a slot structure parameter in the serving cell, a BWP parameter included in the serving cell, frequency domain information of the serving cell, an information element group in the serving cell, a parameter of an information element in the serving cell, a sequence parameter of a synchronization signal in the serving cell, or a common control signaling of the serving cell.

In an example embodiment, in the case where the target element includes the information element, a third-type parameter corresponding to the target element includes at least one of the following parameters of the information element: a time domain parameter, a frequency domain parameter, a code domain parameter, a quasi co-location parameter, a spatial sending filter parameter, downlink timing, a power parameter, a MeasObject corresponding to the information element, timing advance (TA) information, a parameter for determining information bits contained in the information element, or a sequence parameter of a synchronization signal corresponding to the information element.

In an example embodiment, in the first signaling, the first-type parameter corresponding to the target element includes at least one of the following: a first-type parameter configured for the target element through an RRC signaling; or a first-type parameter activated for the target element through a MAC-CE.

In an example embodiment, the TCI state group includes one of the following: a TCI state group composed of TCI states activated for a PDSCH in a BWP through a MAC-CE signaling; a TCI state group composed of TCI states activated for a PDSCH corresponding to a CORESET group through a MAC-CE signaling; a TCI state group composed of TCI states associated with same identification information in a frequency domain bandwidth; a TCI state group composed of TCI states associated with same identification information in a frequency domain bandwidth group; or a TCI state group composed of TCI states corresponding to a code point, where the code point is a code point corresponding to a TCI indication field in downlink control information (DCI). The identification information is included in the TCI state.

In an example embodiment, the receiving module 151 is also configured to receive a third signaling. The third signaling includes at least one of the following information: whether the target element is a mobility measurement reference signal; whether a reference signal associated with the target element is a mobility measurement reference signal; selection information between the first-type parameter and a serving cell index included in the first signaling; or selection information between an information combination and a serving cell index included in the first signaling, where the information combination includes a combination of the first-type parameter and at least one of the following: frequency domain information, MeasObject information, MeasConfig information, or cell group information.

In an example embodiment, in the case where configuration information of the target element does not include the first-type parameter corresponding to the target element, the first-type parameter corresponding to the target element is a first-type parameter configured in a serving cell in which the target element is located; or in the case where configuration information of the target element does not include the first-type parameter corresponding to the target element, the first-type parameter corresponding to the target element is a first-type parameter configured in a common control signaling of a serving cell in which the target element is located.

In an example embodiment, the determination module is also configured to determine a synchronization signal sequence corresponding to the mobility measurement reference signal or the target element according to the first-type parameter; and determine, according to the first-type parameter, the target element group to which the target element belongs, where each PCI corresponds to one target element group.

In an example embodiment, one of the following applies: One serving cell includes at least two target elements, where the at least two target elements included in the serving cell correspond to different first-type parameters; or one BWP includes at least two target elements, where the at least two target elements included in the BWP correspond to different first-type parameters.

In an example embodiment, in the case where the target element includes a quasi co-location reference signal in the TCI state, and one TCI state includes multiple quasi co-location reference signals, the first signaling includes the first-type parameter corresponding to the target element in one of the following manners: Each of the multiple quasi co-location reference signals in the one TCI state corresponds to one first-type parameter; the multiple quasi co-location reference signals in the one TCI state share one first-type parameter; or in the case where a first-type parameter corresponding to a first quasi co-location reference signal in the one TCI state is not configured, the first-type parameter corresponding to the first quasi co-location reference signal is determined according to a first-type parameter corresponding to a second quasi co-location reference signal in the one TCI state.

In an example embodiment, the physical cell identifier satisfies at least one of the following features: Physical cell identifiers included in different MeasObjects do not intersect; a physical cell identifier configured in any MeasObject does not intersect a physical cell identifier configured in a common control signaling of the serving cell; or physical cell identifiers configured in common signalings of different serving cells do not intersect.

In an example embodiment, the physical cell identifier corresponding to the target element satisfies at least one of the following features: The physical cell identifier belongs to a white cell list configured in a MeasObject; the physical cell identifier does not belong to a black cell list configured in a MeasObject; the physical cell identifier dose not intersect a physical cell identifier configured in a common control signaling of the serving cell; the physical cell identifier dose not intersect a physical cell identifier configured in a common control signaling of a target serving cell, where the target element is a target element of the target serving cell; or the physical cell identifier belongs to a predetermined physical cell identifier set in a predetermined MeasObject.

In an example embodiment, in the case where the target element includes the information element, the information element includes a quasi co-location reference signal, and a quasi co-location parameter associated with the quasi co-location reference signal belongs to a first quasi co-location parameter set, the quasi co-location reference signal satisfies one of the following features: A physical cell identifier corresponding to the quasi co-location reference signal satisfies a fourth predetermined condition; the first signaling includes a serving cell index and a first-type parameter corresponding to the quasi co-location reference signal; or a fifth predetermined condition is satisfied between frequency domain information of the quasi co-location reference signal and frequency domain information of the first serving cell.

In an example embodiment, the physical cell identifier satisfies the fourth predetermined condition in the following manner: The physical cell identifier corresponding to the quasi co-location reference signal belongs to a predetermined physical cell identifier set in a predetermined MeasObject. An association exists between the predetermined MeasObject and a second serving cell, or the fifth predetermined condition is satisfied between frequency domain information of the predetermined MeasObject and frequency domain information of a second serving cell.

The second serving cell includes such an information element that a quasi co-location relationship is satisfied between the information element and the quasi co-location reference signal with respect to the quasi co-location parameter in the first quasi co-location parameter set.

In an example embodiment, the determination module is also configured to determine at least one of the following according to a first-type parameter activated in one frequency domain bandwidth: an information element set in the frequency domain bandwidth, a TCI state set in the frequency domain bandwidth, or a value of a third-type parameter of the frequency domain bandwidth.

In an example embodiment, the determination module is also configured to determine a reference signal resource corresponding to the target element according to a value of the first-type parameter and the index of the target element.

In an example embodiment, in the case where the target element includes a quasi co-location reference signal in the TCI state, the determination module is also configured to determine a quasi co-location reference signal resource corresponding to a quasi co-location reference signal index according to the quasi co-location reference signal index in the TCI state and a first-type parameter corresponding to the quasi co-location reference signal; determine a parameter of a quasi co-location reference signal resource corresponding to a quasi co-location reference signal index according to the quasi co-location reference signal index in the TCI state and a first-type parameter corresponding to a quasi co-location reference signal; determine a first-type parameter corresponding to a quasi co-location reference signal in the TCI state according to a MAC-CE signaling; or determine an index of a quasi co-location reference signal in the TCI state according to a first-type parameter corresponding to the quasi co-location reference signal in the TCI state.

In an example embodiment, the TCI state satisfies at least one of the following features: With regard to the same quasi co-location reference signal index of one TCI state, each of the different values of the first-type parameter corresponds to one quasi co-location reference signal resource; with regard to the same quasi co-location reference signal index of one TCI state, each of the different values of the first-type parameter corresponds to one value of a parameter of a quasi co-location reference signal resource; the same TCI state is shared between multiple values of the first-type parameter; one TCI state includes configuration information of a correspondence between the first-type parameter and a quasi co-location reference signal index; or one TCI state includes configuration information of a correspondence between the first-type parameter and different values of a parameter of the same quasi co-location reference signal index.

In an example embodiment, in the case where the target element includes the serving cell, and one serving cell corresponds to multiple first-type parameters, each of the multiple first-type parameters corresponds to one parameter value set of an SSB.

In an example embodiment, in the case where the target element includes the information element, a first-type parameter corresponding to the information element is determined according to a sequence generation parameter of the information element; or a first-type parameter corresponding to a reference signal associated with the information element is determined according to a sequence generation parameter of the information element.

In an example embodiment, the determination module is also configured to determine at least one of the following according to at least one of a fourth signaling or a fourth predetermined rule: a measurement time of a first reference signal corresponding to the first-type parameter; a synchronization signal set corresponding to the first-type parameter; or whether a resource occupied by a second reference signal corresponding to the first-type parameter is an available resource of a predetermined information element, where the resource includes at least one of a time domain resource or a frequency domain resource.

In an example embodiment, at least one of the following applies: After a predetermined time begins, the configuration of a measurement gap (measGap) is omitted for the measurement time of a first reference signal corresponding to the first-type parameter. Before a predetermined time begins, the measurement time of a first reference signal corresponding to the first-type parameter is in a measGap. After a predetermined time begins, the configuration of an SMTC is omitted for the measurement time of a synchronization signal corresponding to the first-type parameter. Before a predetermined time begins, the measurement time of a synchronization signal corresponding to the first-type parameter is in an SMTC. After a predetermined time begins, a synchronization signal set corresponding to the first-type parameter is a first set, where in the case where the target element includes a synchronization signal, the target element belongs to the first set. Before a predetermined time begins, a synchronization signal set corresponding to the first-type parameter is a second set, where in the case where the target element includes a synchronization signal, the target element belongs to the second set. After a predetermined time begins, a resource occupied by a second reference signal corresponding to the first-type parameter is not an available resource of the predetermined information element. Before a predetermined time begins, a resource occupied by a second reference signal corresponding to the first-type parameter is an available resource of the predetermined information element. The predetermined time includes one of the following: a predetermined time after the first signaling is received; or a predetermined time after a hybrid automatic repeat request acknowledgement (HARQ-ACK) feedback with regard to a PDSCH including the first signaling is sent.

In an example embodiment, a reference signal corresponding to the first-type parameter includes at least one of the following: a mobility measurement reference signal corresponding to the first-type parameter in a MeasObject; the target element that includes the information element; a synchronization signal corresponding to the first-type parameter; a reference signal corresponding to the first-type parameter and configured in a serving cell; a reference signal in a predetermined reference signal resource set corresponding to the first-type parameter; or a quasi co-location reference signal set associated with the first-type parameter in an activated TCI state.

In an example embodiment, in the case where the target element includes a quasi co-location reference signal in the TCI state, and one TCI state includes multiple quasi co-location reference signals, the first signaling includes the first-type parameter corresponding to the target element and the second-type parameter corresponding to the target element in one of the following manners: Each of the multiple quasi co-location reference signals in the one TCI state corresponds to one parameter combination value; the multiple quasi co-location reference signals in the one TCI state share one parameter combination value; in a case where a parameter combination value corresponding to a first quasi co-location reference signal in the one TCI state is not configured, the parameter combination value corresponding to the first quasi co-location reference signal in the one TCI state is determined according to a parameter combination value corresponding to a second quasi co-location reference signal in the one TCI state; or the multiple quasi co-location reference signals in the one TCI state share one second-type parameter, and each of the multiple quasi co-location reference signals corresponds to one first-type parameter. The parameter combination value includes a combination value of the first-type parameter and the second-type parameter.

Figure 16:
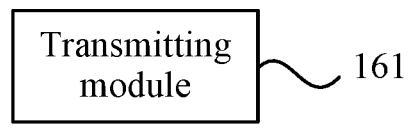
FIG. 16 is a block diagram of a signaling transmitting apparatus according to the present application.

FIG. 16 is a diagram illustrating the structure of a signaling transmitting apparatus according to an embodiment of the present application. As shown in FIG. 16, the apparatus according to the present application includes a transmitting module 161.

The transmitting module 161 is configured to transmit a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

In an example embodiment, the apparatus according to the present application also includes a determination module. The determination module is configured to determine, according to the first-type parameter corresponding to the target element, a first-type parameter corresponding to the information element associated with the target element.

In an example embodiment, in the case where the target element includes a control resource set (CORESET) or a CORESET group, the information element associated with the target element includes at least one of the following: an information element scheduled by a physical downlink control channel (PDCCH) in the target element; an information element in a physical downlink shared channel (PDSCH) scheduled by a PDCCH whose scheduling signaling is included in the target element; an information element associated with the target element and determined according to a second signaling, where the second signaling includes an association between the information element and the target element; or an information element associated with the target element and determined according to a second predetermined rule. The second signaling is a signaling transmitted by a base station and received by a terminal. The second predetermined rule may be configured according to requirements.

In an example embodiment, the information element associated with the target element is determined according to the second predetermined rule in one of the following manners: An association exists between a periodic or semi-persistent information element and a pre-indexed target element; or a first-type parameter corresponding to a periodic or semi-persistent information element is acquired according to a first-type parameter corresponding to a non-periodic information element, where the first-type parameter corresponding to the non-periodic information element is acquired according to a first-type parameter corresponding to a target element in which a PDCCH scheduling the non-periodic element is located.

In an example embodiment, determining, according to the first-type parameter corresponding to the target element, the first-type parameter corresponding to the information element associated with the target element includes determining, according to the first-type parameter corresponding to the target element, a first-type parameter corresponding to a third-type parameter of the information element associated with the target element.

In an example embodiment, in the case where the target element includes the information element, the information element associated with the target element includes at least one of the following: a quasi co-location reference signal of the target element; a reference signal in spatial relationship information of the target element; a pathloss reference signal of the target element; or an information element, where an association exists between the information element and the target element.

In an example embodiment, in the case where the target element includes the serving cell or the BWP, the information element associated with the target element includes an information element located in the target element.

In an example embodiment, determining, according to the first-type parameter corresponding to the target element, the first-type parameter corresponding to the information element associated with the target element includes determining a first-type parameter corresponding to a periodic or semi-persistent information element according to a first-type parameter corresponding to a non-periodic information element, where an association exists between the periodic or semi-persistent information element and the non-periodic information element.

In an example embodiment, in the case where the target element includes the TCI state, and the information element associated with the target element includes a quasi co-location reference signal in the TCI state, the determination module is also configured to perform one of the following: determining a reference signal resource corresponding to a quasi co-location reference signal index according to the quasi co-location reference signal index in the TCI state and the first-type parameter; or determining a parameter of a reference signal resource corresponding to a quasi co-location reference signal index according to the quasi co-location reference signal index in the TCI state and the first-type parameter.

With regard to the same quasi co-location reference signal index in the same TCI state, different first-type parameters each correspond to one quasi co-location reference signal resource. With regard to the same quasi co-location reference signal index in the same TCI state, different first-type parameters each correspond to one value of the parameter of the quasi co-location reference signal resource.

In an example embodiment, in the case where the target element includes a group, the group includes one of the following: the information element group, the TCI state group, the serving cell group, or the BWP group; and the first signaling includes the first-type parameter corresponding to the target element in one of the following manners: The first signaling includes a first-type parameter corresponding to the group, where elements in the group correspond to the same first-type parameter; or the first signaling includes a first-type parameter corresponding to an element in the group, where elements in the group correspond to the same first-type parameter.

In an example embodiment, the first signaling includes the first-type parameter corresponding to the target element and a second-type parameter corresponding to the target element. The second-type parameter includes at least one of the following: a frequency domain parameter, a slot structure parameter, a subcarrier spacing, a measurement object identifier (MeasObjectID), a measurement identifier (MeasID), a serving cell index, a measurement configuration identifier (MeasConfigId), cell group information, or an absolute radio-frequency channel number-ValueNR (ARFCN-ValueNR). One MeasID includes one MeasObjectID and one report configuration identifier (reportConfigID).

In an example embodiment, the determination module is also configured to determine at least one of the following information of the target element according to the second-type parameter: a frequency domain bandwidth, a frequency domain reference point A, or a MeasObject to which the target element belongs.

In an example embodiment, the determination module is also configured to determine a third-type parameter corresponding to the target element according to the first-type parameter corresponding to the target element.

In an example embodiment, the determination module is also configured to perform at least one of the following: determine the third-type parameter corresponding to the target element according to the first-type parameter and the second-type parameter corresponding to the target element; or determine the first-type parameter and the second-type parameter of the information element corresponding to the target element according to the first-type parameter and the second-type parameter corresponding to the target element.

In an example embodiment, determining, according to the first-type parameter corresponding to the target element, the third-type parameter corresponding to the target element includes determining a mapping between A values of the first-type parameter and B values of the third-type parameter corresponding to the target element. A is a positive integer greater than or equal to 1, and B is a positive integer less than or equal to A. A mapping between A values of the first-type parameter and B values of the third-type parameter corresponding to the target element may be determined according to signaling information or a predetermined rule.

In an example embodiment, determining the third-type parameter corresponding to the target element according to the first-type parameter corresponding to the target element and the second-type parameter corresponding to the target element includes determining a mapping between C combination values of the first-type parameter and the second-type parameter and D values of the third-type parameter corresponding to the target element. C is a positive integer greater than or equal to 1, and D is a positive integer less than or equal to C.

In an example embodiment, in the case where the target element includes the information element, and the first-type parameter includes the mobility measurement reference signal, the first signaling includes a mobility measurement reference signal corresponding to the information element. The first signaling includes at least one of the following: a configuration signaling of a quasi co-location reference signal of the information element; a configuration signaling of a spatial relationship of the information element; a configuration signaling of a pathloss reference signal of the information element; a configuration signaling of downlink timing of the information element; or a configuration signaling of a timing advance (TA) of the information element.

In an example embodiment, in the case where the target element includes the information element, and the first-type parameter includes the mobility measurement reference signal, the first signaling includes the mobility measurement reference signal corresponding to the information element in the following manner: The first signaling includes at least one of the following corresponding to the mobility measurement reference signal: a physical cell identifier, a MeasObjectID, a MeasConfigID, cell group information, or a resource index of the mobility measurement reference signal.

In an example embodiment, in the case where the mobility measurement reference signal includes a synchronization signal, a synchronization signal index corresponding to the mobility measurement reference signal belongs to a synchronization signal time domain index set selected from a MeasObject corresponding to the MeasObjectID. In an example embodiment, a synchronization signal time domain index corresponding to the mobility measurement reference signal belongs to a synchronization signal time domain index set selected from a MeasObject.

In an example embodiment, the first-type parameter or a MeasObject to which the target element belongs includes at least one of the following: a MeasObject corresponding to a serving cell measurement object (servingCellMO) in a serving cell in which the target element is located; a MeasObject whose frequency domain information satisfies a first predetermined condition and that corresponds to a target element whose serving cell has frequency domain information that satisfies the first predetermined condition; a MeasObject whose frequency domain information satisfies a second predetermined condition and that corresponds to a first-type parameter whose frequency domain information satisfies the second predetermined condition; or a MeasObject whose frequency domain information satisfies a third predetermined condition and that corresponds to a target element whose frequency domain information satisfies the third predetermined condition.

In an example embodiment, the first-type parameter or a MeasObject to which the target element belongs includes a MeasConfig corresponding to a cell group in which the target element is located.

In an example embodiment, the information element includes at least one of the following: a quasi co-location reference signal, a pathloss reference signal, a reference signal included in a spatial relationship, a CORESET, an information element in a serving cell, a data channel, a control channel, a reference signal, a synchronization signal, or a random access signal.

In an example embodiment, the first signaling includes at least one of the following: a radio resource control (RRC) signaling or a medium access control-control element (MAC-CE) signaling.

In an example embodiment, the first signaling includes the first-type parameter corresponding to the target element in the following manner: X values of the first-type parameter are configured, in an RRC signaling, for the target element, where X is a positive integer greater than or equal to 1.

In an example embodiment, in the case where the X values of the first-type parameter are configured, in the RRC signaling, for the target element, the following is also included: activating, for the target element, Y values among the X values of the first-type parameter through a MAC-CE signaling. Y is a positive integer less than or equal to X.

In an example embodiment, in the case where the target element includes the serving cell, the X values of the first-type parameter are configured, in the RRC signaling, for the target element in at least one of the following manners: One value of the first-type parameter is configured, in a common control signaling of the serving cell, for the serving cell; or at least one value of the first-type parameter is configured, in a dedicated control signaling of the serving cell, for the serving cell.

In an example embodiment, the first signaling includes the first-type parameter corresponding to the target element and the second-type parameter corresponding to the target element in the following manner: E combination values are configured, in an RRC signaling, for the target element. E is a positive integer greater than or equal to 1. The combination values are combination values of the first-type parameter and the second-type parameter.

In an example embodiment, the first signaling includes the first-type parameter corresponding to the target element and the second-type parameter corresponding to the target element also in the following manner: A MAC-CE signaling activates, for the target element, F combination values among the E combination values. F is a positive integer less than or equal to E.

In an example embodiment, in the case where the target element includes the serving cell, a third-type parameter corresponding to the target element includes at least one of the following: a slot structure parameter in the serving cell, a BWP parameter included in the serving cell, frequency domain information of the serving cell, an information element group in the serving cell, a parameter of an information element in the serving cell, a sequence parameter of a synchronization signal in the serving cell, or a common control signaling of the serving cell.

In an example embodiment, in the case where the target element includes the information element, a third-type parameter corresponding to the target element includes at least one of the following parameters of the information element: a time domain parameter, a frequency domain parameter, a code domain parameter, a quasi co-location parameter, a spatial sending filter parameter, downlink timing, a power parameter, a MeasObject corresponding to the information element, timing advance (TA) information, a parameter for determining information bits contained in the information element, or a sequence parameter of a synchronization signal corresponding to the information element.

In an example embodiment, in the first signaling, the first-type parameter corresponding to the target element includes at least one of the following: a first-type parameter configured for the target element through an RRC signaling; or a first-type parameter activated for the target element through a MAC-CE.

In an example embodiment, the TCI state group includes one of the following: a TCI state group composed of TCI states activated for a PDSCH in a BWP through a MAC-CE signaling; a TCI state group composed of TCI states activated for a PDSCH corresponding to a CORESET group through a MAC-CE signaling; a TCI state group composed of TCI states associated with same identification information in a frequency domain bandwidth; a TCI state group composed of TCI states associated with same identification information in a frequency domain bandwidth group; or a TCI state group composed of TCI states corresponding to a code point, where the code point is a code point corresponding to a TCI indication field in downlink control information (DCI). The identification information is included in the TCI state.

In an example embodiment, the transmitting module 161 is also configured to transmit a third signaling. The third signaling includes at least one of the following information: whether the target element is a mobility measurement reference signal; whether a reference signal associated with the target element is a mobility measurement reference signal; selection information between the first-type parameter and a serving cell index included in the first signaling; or selection information between an information combination and a serving cell index included in the first signaling, where the information combination includes a combination of the first-type parameter and at least one of the following: frequency domain information, measObject information, MeasConfig information, or cell group information.

In an example embodiment, in the case where configuration information of the target element does not include the first-type parameter corresponding to the target element, the first-type parameter corresponding to the target element is a first-type parameter configured in a serving cell in which the target element is located; or in the case where configuration information of the target element does not include the first-type parameter corresponding to the target element, the first-type parameter corresponding to the target element is a first-type parameter configured in a common control signaling of a serving cell in which the target element is located.

In an example embodiment, the determination module is also configured to determine a synchronization signal sequence corresponding to the mobility measurement reference signal or the target element according to the first-type parameter; and determine, according to the first-type parameter, the target element group to which the target element belongs, where each PCI corresponds to one target element group.

In an example embodiment, one of the following applies: One serving cell includes at least two target elements, where the at least two target elements included in the serving cell correspond to different first-type parameters; or one BWP includes at least two target elements, where the at least two target elements included in the BWP correspond to different first-type parameters.

In an example embodiment, in the case where the target element includes a quasi co-location reference signal in the TCI state, and one TCI state includes multiple quasi co-location reference signals, the first signaling includes the first-type parameter corresponding to the target element in one of the following manners: Each of the multiple quasi co-location reference signals in the one TCI state corresponds to one first-type parameter; the multiple quasi co-location reference signals in the one TCI state share one first-type parameter; or in the case where a first-type parameter corresponding to a first quasi co-location reference signal in the one TCI state is not configured, the first-type parameter corresponding to the first quasi co-location reference signal is determined according to a first-type parameter corresponding to a second quasi co-location reference signal in the one TCI state.

In an example embodiment, the physical cell identifier satisfies at least one of the following features: Physical cell identifiers included in different MeasObjects do not intersect; a physical cell identifier configured in any MeasObject does not intersect a physical cell identifier configured in a common control signaling of the serving cell; or physical cell identifiers configured in common signalings of different serving cells do not intersect.

In an example embodiment, the physical cell identifier corresponding to the target element satisfies at least one of the following features: The physical cell identifier belongs to a white cell list configured in a MeasObject; the physical cell identifier does not belong to a black cell list configured in a MeasObject; the physical cell identifier dose not intersect a physical cell identifier configured in a common control signaling of the serving cell; the physical cell identifier dose not intersect a physical cell identifier configured in a common control signaling of a target serving cell, where the target element is a target element of the target serving cell; or the physical cell identifier belongs to a predetermined physical cell identifier set in a predetermined MeasObject.

In an example embodiment, in the case where the target element includes the information element, the information element includes a quasi co-location reference signal, and a quasi co-location parameter associated with the quasi co-location reference signal belongs to a first quasi co-location parameter set, the quasi co-location reference signal satisfies one of the following features: A physical cell identifier corresponding to the quasi co-location reference signal satisfies a fourth predetermined condition; the first signaling includes a serving cell index and a first-type parameter corresponding to the quasi co-location reference signal; or a fifth predetermined condition is satisfied between frequency domain information of the quasi co-location reference signal and frequency domain information of the first serving cell.

In an example embodiment, the physical cell identifier satisfies the fourth predetermined condition in the following manner: The physical cell identifier corresponding to the quasi co-location reference signal belongs to a predetermined physical cell identifier set in a predetermined MeasObject. An association exists between the predetermined MeasObject and a second serving cell, or the fifth predetermined condition is satisfied between frequency domain information of the predetermined MeasObject and frequency domain information of a second serving cell.

The second serving cell includes such an information element that a quasi co-location relationship is satisfied between the information element and the quasi co-location reference signal with respect to the quasi co-location parameter in the first quasi co-location parameter set.

In an example embodiment, the determination module is also configured to determine at least one of the following according to a first-type parameter activated in one frequency domain bandwidth: an information element set in the frequency domain bandwidth, a TCI state set in the frequency domain bandwidth, or a value of a third-type parameter of the frequency domain bandwidth.

In an example embodiment, the determination module is also configured to determine a reference signal resource corresponding to the target element according to a value of the first-type parameter and the index of the target element.

In an example embodiment, in the case where the target element includes a quasi co-location reference signal in the TCI state, the determination module is also configured to determine a quasi co-location reference signal resource corresponding to a quasi co-location reference signal index according to the quasi co-location reference signal index in the TCI state and a first-type parameter corresponding to the quasi co-location reference signal; determine a parameter of a quasi co-location reference signal resource corresponding to a quasi co-location reference signal index according to the quasi co-location reference signal index in the TCI state and a first-type parameter corresponding to a quasi co-location reference signal; determine a first-type parameter corresponding to a quasi co-location reference signal in the TCI state according to a MAC-CE signaling; or determine an index of a quasi co-location reference signal in the TCI state according to a first-type parameter corresponding to the quasi co-location reference signal in the TCI state.

In an example embodiment, the TCI state satisfies at least one of the following features: With regard to the same quasi co-location reference signal index of one TCI state, each of the different values of the first-type parameter corresponds to one quasi co-location reference signal resource; with regard to the same quasi co-location reference signal index of one TCI state, each of the different values of the first-type parameter corresponds to one value of a parameter of a quasi co-location reference signal resource; the same TCI state is shared between multiple values of the first-type parameter; one TCI state includes configuration information of a correspondence between the first-type parameter and a quasi co-location reference signal index; or one TCI state includes configuration information of a correspondence between the first-type parameter and different values of a parameter of the same quasi co-location reference signal index.

In an example embodiment, in the case where the target element includes the serving cell, and one serving cell corresponds to multiple first-type parameters, each of the multiple first-type parameters corresponds to one parameter value set of an SSB.

In an example embodiment, in the case where the target element includes the information element, a first-type parameter corresponding to the information element is determined according to a sequence generation parameter of the information element; or a first-type parameter corresponding to a reference signal associated with the information element is determined according to a sequence generation parameter of the information element.

In an example embodiment, the determination module is also configured to determine at least one of the following according to at least one of a fourth signaling or a fourth predetermined rule: a measurement time of a first reference signal corresponding to the first-type parameter; a synchronization signal set corresponding to the first-type parameter; or whether a resource occupied by a second reference signal corresponding to the first-type parameter is an available resource of a predetermined information element, where the resource includes at least one of a time domain resource or a frequency domain resource.

In an example embodiment, at least one of the following applies: After a predetermined time begins, the configuration of a measurement gap (measGap) is omitted for the measurement time of a first reference signal corresponding to the first-type parameter. Before a predetermined time begins, the measurement time of a first reference signal corresponding to the first-type parameter is in a measGap. After a predetermined time begins, the configuration of an SMTC is omitted for the measurement time of a synchronization signal corresponding to the first-type parameter. Before a predetermined time begins, the measurement time of a synchronization signal corresponding to the first-type parameter is in an SMTC. After a predetermined time begins, a synchronization signal set corresponding to the first-type parameter is a first set, where in the case where the target element includes a synchronization signal, the target element belongs to the first set. Before a predetermined time begins, a synchronization signal set corresponding to the first-type parameter is a second set, where in the case where the target element includes a synchronization signal, the target element belongs to the second set. After a predetermined time begins, a resource occupied by a second reference signal corresponding to the first-type parameter is not an available resource of the predetermined information element. Before a predetermined time begins, a resource occupied by a second reference signal corresponding to the first-type parameter is an available resource of the predetermined information element. The predetermined time includes one of the following: a predetermined time after the first signaling is received; or a predetermined time after a hybrid automatic repeat request acknowledgement (HARQ-ACK) feedback with regard to a PDSCH including the first signaling is sent.

In an example embodiment, a reference signal corresponding to the first-type parameter includes at least one of the following: a mobility measurement reference signal corresponding to the first-type parameter in a MeasObject; the target element that includes the information element; a synchronization signal corresponding to the first-type parameter; a reference signal corresponding to the first-type parameter and configured in a serving cell; a reference signal in a predetermined reference signal resource set corresponding to the first-type parameter; or a quasi co-location reference signal set associated with the first-type parameter in an activated TCI state.

In an example embodiment, in the case where the target element includes a quasi co-location reference signal in the TCI state, and one TCI state includes multiple quasi co-location reference signals, the first signaling includes the first-type parameter corresponding to the target element and the second-type parameter corresponding to the target element in one of the following manners: Each of the multiple quasi co-location reference signals in the one TCI state corresponds to one parameter combination value; the multiple quasi co-location reference signals in the one TCI state share one parameter combination value; in a case where a parameter combination value corresponding to a first quasi co-location reference signal in the one TCI state is not configured, the parameter combination value corresponding to the first quasi co-location reference signal in the one TCI state is determined according to a parameter combination value corresponding to a second quasi co-location reference signal in the one TCI state; or the multiple quasi co-location reference signals in the one TCI state share one second-type parameter, and each of the multiple quasi co-location reference signals corresponds to one first-type parameter. The parameter combination value includes a combination value of the first-type parameter and the second-type parameter.

Figure 17:
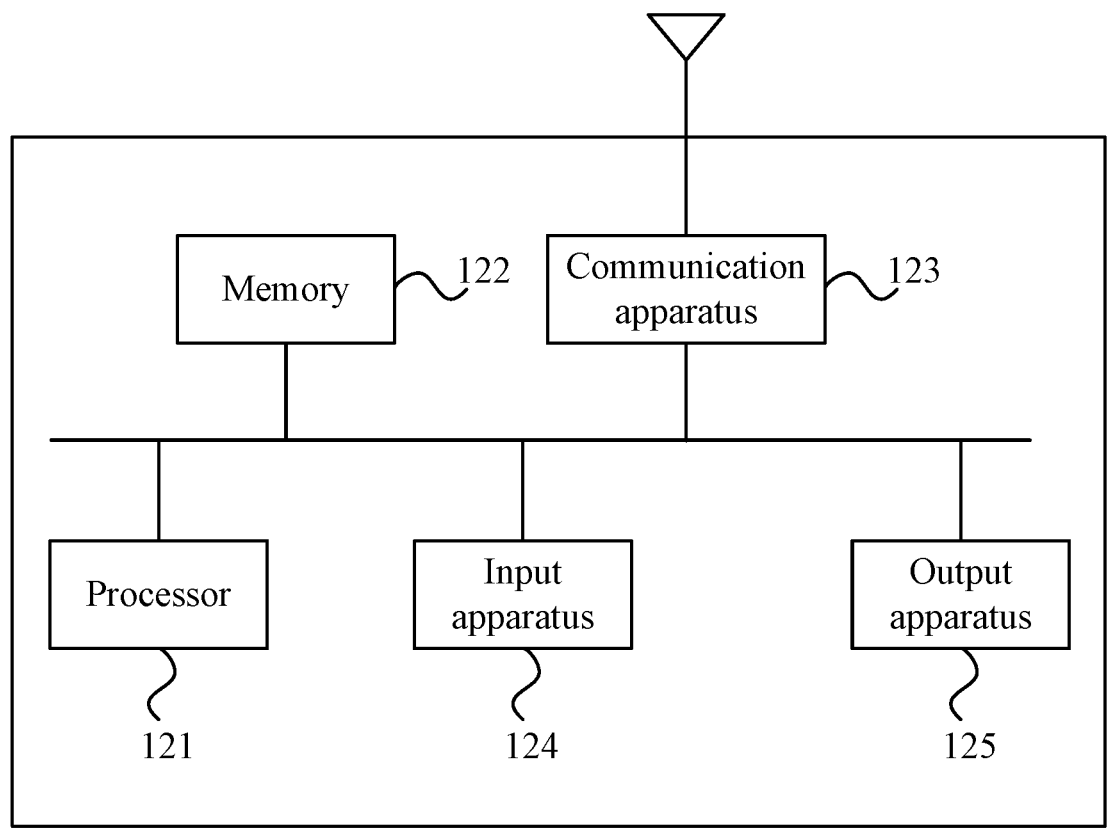
FIG. 17 is a diagram illustrating the structure of a device according to the present application.

An embodiment of the present application provides a device. FIG. 17 is a diagram illustrating the structure of the device according to the present application. As shown in FIG. 17, the device according to the present application includes one or more processors 121 and a memory 122. In FIG. 17, one processor 121 is provided by way of example. The memory 122 is used for storing one or more programs. When executed by the one or more processors 121, the one or more programs cause the one or more processors 121 to perform the method according to any embodiment of the present application.

The device also includes a communication apparatus 123, an input apparatus 124, and an output apparatus 125.

The processor 121, the memory 122, the communication apparatus 123, the input apparatus 124, and the output apparatus 125 in the device may be connected through a bus or in other manners. In FIG. 17, connection through a bus is performed by way of example.

The input apparatus 124 may be used for receiving input digital or character information and generating keying signal input related to user settings of the device and function control of the device. The output apparatus 125 may include display devices such as a display screen.

The communication apparatus 123 may include a receiver and a transmitter. The communication apparatus 123 is configured to perform information transceiving and communication under the control of the processor 121.

As a computer-readable storage medium, the memory 122 may be configured to store software programs, computer-executable programs, and modules, for example, program instructions/modules (for example, the receiving module 151 in the signaling receiving apparatus) corresponding to the signaling receiving method according to any embodiment of the present application and program instructions/modules (for example, the transmitting module 161 in the signaling transmitting apparatus) corresponding to the signaling transmitting method according to any embodiment of the present application. The memory 122 may include a program storage region and a data storage region. The program storage region may store an operating system and an application program required by at least one function. The data storage region may store data created according to the use of the device. Additionally, the memory 122 may include a high-speed random-access memory and may also include a nonvolatile memory such as at least one disk memory, flash memory, or another nonvolatile solid-state memory. In some examples, the memory 122 may include memories disposed remote from the processor 121 and connectable to the device via a network. Examples of the preceding network include, but are not limited to, the Internet, an intranet, a local area network, a mobile communication network, and a combination thereof.

An embodiment of the present application provides a storage medium. The storage medium stores a computer program which, when executed by a processor, causes the processor to perform the method according to any embodiment of the present application.

When the signaling receiving method according to any embodiment of the present application is performed, the method includes receiving a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

Alternatively, when the signaling transmitting method according to any embodiment of the present application is performed, the method includes transmitting a first signaling. The first signaling includes a first-type parameter corresponding to a target element. The first-type parameter includes at least one of the following: a physical cell identifier, a mobility measurement reference signal, or a sequence parameter of a synchronization signal. The target element includes one of the following: a serving cell, a serving cell group, a BWP, a BWP group, an information element, an information element group, a TCI state, or a TCI state group. The information element includes at least one of the following: a channel or a signal.

The term user terminal encompasses any appropriate type of wireless user device such as a mobile phone, a portable data processing apparatus, a portable web browser or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination thereof. Computer programs may be stored on a memory. The memory may be of any type suitable for a local technical environment and may be implemented using any suitable data storage technology. The memory may be, but not limited to, a read-only memory (ROM), a random-access memory (RAM), or an optical memory device and system (for example, a digital video disc (DVD) or a compact disc (CD)). The computer-readable medium may be, for example, a non-transitory storage medium. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), or a processor based on a multi-core processor architecture.

What is claimed is:

1. A signaling receiving method, comprising:
receiving a first signaling, wherein the first signaling comprises a first-type parameter corresponding to a target element, wherein
the first-type parameter comprises a physical cell identifier (PCI) and the target element comprises one of the following: a serving cell, an information element which comprises at least one of a channel or a signal, an information element group, a transmission configuration indicator (TCI) state group;
in a case where the target element comprises the serving cell and multiple PCIs are configured for the serving cell through a radio resource control (RRC) signaling, each of the multiple PCIs corresponds to one configuration value of at least one of the following parameters: a position of a synchronization signal block (SSB) in a burst, a period of an SSB, or a transmit power of an SSB, and the multiple PCIs correspond to a same SSB parameter which comprises a center carrier in which an SSB is located and a subcarrier spacing of an SSB.

2. The method of claim 1, wherein the first signaling comprises the first-type parameter corresponding to the target element and a second-type parameter corresponding to the target element, wherein
the second-type parameter comprises at least one of the following: a frequency domain parameter, a slot structure parameter, a subcarrier spacing, a serving cell index, or an absolute radio-frequency channel number-ValueNR (ARFCN-ValueNR); and
in a case where the second-type parameter comprises the absolute radio-frequency channel number-ValueNR (ARFCN-ValueNR), the method further comprises: determining at least one of the following information of the target element according to the second-type parameter:
a frequency domain bandwidth or a frequency domain reference point.

3. The method of claim 1, further comprising determining a third-type parameter corresponding to the target element according to the first-type parameter corresponding to the target element;
wherein in a case where the target element comprises the information element, and the information element is a downlink information element, a third-type parameter corresponding to the target element comprises a rate matching parameter; or
in a case where the target element comprises the information element, and the information element is an uplink information element, a third-type parameter corresponding to the target element comprises at least one of the following parameters of the information element: a rate matching parameter, a power parameter, a channel multiplexing parameter, or a timing advance (TA) parameter.

4. The method of claim 1, wherein the first signaling comprises the first-type parameter corresponding to the target element in the following manner:
X values of the first-type parameter are configured, in the RRC signaling, for the target element, wherein the RRC signaling is received from a base station and X is a positive integer greater than or equal to 1.

5. The method of claim 4, in the case where the X values of the first-type parameter are configured, in the RRC signaling, for the target element, the method further comprises:
receiving a medium access control-control element (MAC-CE) signaling from the base station; and
activating, for the target element, Y values among the X values of the first-type parameter through the MAC-CE signaling, wherein
Y is a positive integer less than or equal to X.

6. The method of claim 4, wherein
in a case where the target element comprises the serving cell, the X values of the first-type parameter are configured, in the RRC signaling, for the target element in at least one of the following manners: one value of the first-type parameter is configured, in a common control signaling of the serving cell, for the serving cell; or at least one value of the first-type parameter is configured, in a dedicated control signaling of the serving cell, for the serving cell; and
in a case where configuration information of the target element does not comprise the first-type parameter corresponding to the target element, the first-type parameter corresponding to the target element is a first-type parameter configured in a common control signaling of a serving cell in which the target element is located.

7. The method of claim 1, wherein the TCI state group comprises one of the following:
a TCI state group composed of TCI states activated for a physical downlink shared channel (PDSCH) corresponding to a control resource set (CORESET) group through a MAC-CE signaling;
a TCI state group composed of TCI states associated with same identification information in a frequency domain bandwidth, wherein the identification information is comprised in the TCI state;
a TCI state group composed of TCI states associated with same identification information in a frequency domain bandwidth group, wherein the identification information is comprised in the TCI state; or
a TCI state group composed of TCI states corresponding to a code point, wherein the code point is a code point corresponding to a TCI indication field in downlink control information (DCI).

8. The method of claim 1, wherein in a case where the target element comprises a quasi co-location reference signal in the TCI state, and one TCI state comprises multiple quasi co-location reference signals, the first signaling comprises the first-type parameter corresponding to the target element in one of the following manners:
- the multiple quasi co-location reference signals in the one TCI state share one first-type parameter; or
- in a case where a first-type parameter corresponding to a first quasi co-location reference signal in the one TCI state is not configured, the first-type parameter corresponding to the first quasi co-location reference signal is determined according to a first-type parameter corresponding to a second quasi co-location reference signal in the one TCI state.

9. The method of claim 1, wherein the physical cell identifier corresponding to the target element satisfies at least one of the following features:
- the physical cell identifier belongs to a white cell list configured in a MeasObject;
- the physical cell identifier does not belong to a black cell list configured in a MeasObject;
- the physical cell identifier does not intersect a physical cell identifier configured in a common control signaling of a target serving cell, wherein the target element is a target element of the target serving cell; or
- the physical cell identifier belongs to a predetermined physical cell identifier set in a predetermined MeasObject.

10. The method of claim 1, further comprising at least one of the following:
- after a predetermined time begins, the configuration of a measurement gap (MeasGap) is omitted for the measurement time of a first reference signal corresponding to the first-type parameter;
- before a predetermined time begins, the measurement time of a first reference signal corresponding to the first-type parameter is in the MeasGap;
- after a predetermined time begins, the configuration of an SSB-based RRM Measurement Timing Configuration (SMTC) is omitted for the measurement time of a synchronization signal corresponding to the first-type parameter;
- before a predetermined time begins, the measurement time of a synchronization signal corresponding to the first-type parameter is in an SMTC;
- after a predetermined time begins, a resource occupied by a second reference signal corresponding to the first-type parameter is not an available resource of the predetermined information element;
- before a predetermined time begins, a resource occupied by a second reference signal corresponding to the first-type parameter is an available resource of the predetermined information element;
- wherein the predetermined time comprises one of the following: a predetermined time after the first signaling is received; or a predetermined time after a hybrid automatic repeat request acknowledgement (HARQ-ACK) feedback with regard to a PDSCH including the first signaling is sent;
- wherein at least one of the first reference signal or the second reference signal corresponding to the first-type parameter comprises a synchronization signal corresponding to the first-type parameter.

11. A signaling transmitting method, comprising:
- transmitting a first signaling, wherein the first signaling comprises a first-type parameter corresponding to a target element, wherein
- the first-type parameter comprises a physical cell identifier (PCI) and the target element comprises one of the following: a serving cell, an information element which comprises at least one of a channel or a signal, an information element group, a transmission configuration indicator (TCI) state group;
- in a case where the target element comprises the serving cell and multiple PCIs are configured for the serving cell through a radio resource control (RRC) signaling, each of the multiple PCIs corresponds to one configuration value of at least one of the following parameters: a position of a synchronization signal block (SSB) an SSB in a burst, a period of an SSB, or a transmit power of an SSB, and the multiple PCIs correspond to a same SSB parameter which comprises a center carrier in which an SSB is located and a subcarrier spacing of an SSB.

12. The method of claim 11, wherein the first signaling comprises the first-type parameter corresponding to the target element and a second-type parameter corresponding to the target element, wherein
- the second-type parameter comprises at least one of the following: a frequency domain parameter, a slot structure parameter, a subcarrier spacing, a serving cell index, or an absolute radio-frequency channel number-ValueNR (ARFCN-ValueNR); and
- in a case where the second-type parameter comprises the absolute radio-frequency channel number-ValueNR (ARFCN-ValueNR), the method further comprises: determining at least one of the following information of the target element according to the second-type parameter:
- a frequency domain bandwidth or a frequency domain reference point.

13. The method of claim 11, further comprising determining a third-type parameter corresponding to the target element according to the first-type parameter corresponding to the target element;
- wherein in a case where the target element comprises the information element, and the information element is a downlink information element, a third-type parameter corresponding to the target element comprises a rate matching parameter; or
- in a case where the target element comprises the information element, and the information element is an uplink information element, a third-type parameter corresponding to the target element comprises at least one of the following parameters of the information element: a rate matching parameter, a power parameter, a channel multiplexing parameter, or a timing advance (TA) parameter.

14. The method of claim 11, further comprising:
- transmitting the RRC signaling which is used for configuring X values of the first-type parameter for the target element, wherein X is a positive integer greater than or equal to 1.

15. The method of claim 14, further comprising:
- transmitting a medium access control-control element (MAC-CE) signaling which is used for activating Y values among the X values of the first-type parameter for the target element, wherein Y is a positive integer less than or equal to X.

16. The method of claim 14, wherein
- in a case where the target element comprises the serving cell, the X values of the first-type parameter are configured, in the RRC signaling, for the target element in at least one of the following manners: one value of the first-type parameter is configured, in a common control signaling of the serving cell, for the serving cell; or at least one value of the first-type parameter is configured, in a proprietary control signaling of the serving cell, for the serving cell; and in a case where configuration information of the target element does not comprise the first-type parameter corresponding to the target element, the first-type parameter corresponding to the target element is a first-type parameter configured in a common control signaling of a serving cell in which the target element is located.

17. The method of claim 11, wherein the TCI state group comprises one of the following:
   a TCI state group composed of TCI states activated for a physical downlink shared channel (PDSCH) corresponding to a control resource set (CORESET) group through a MAC-CE signaling;
   a TCI state group composed of TCI states associated with same identification information in a frequency domain bandwidth;
   a TCI state group composed of TCI states associated with same identification information in a frequency domain bandwidth group; or
   a TCI state group composed of TCI states corresponding to a code point, wherein the code point is a code point corresponding to a TCI indication field in downlink control information (DCI),
   wherein the identification information is comprised in the TCI state.

18. The method of claim 11, wherein in a case where the target element comprises a quasi co-location reference signal in the TCI state, and one TCI state comprises multiple quasi co-location reference signals, the first signaling comprises the first-type parameter corresponding to the target element in one of the following manners:
   the multiple quasi co-location reference signals in the one TCI state share one first-type parameter; or
   in a case where a first-type parameter corresponding to a first quasi co-location reference signal in the one TCI state is not configured, the first-type parameter corresponding to the first quasi co-location reference signal is determined according to a first-type parameter corresponding to a second quasi co-location reference signal in the one TCI state.

19. The method of claim 11, wherein the physical cell identifier corresponding to the target element satisfies at least one of the following features:
   the physical cell identifier belongs to a white cell list configured in a MeasObject;
   the physical cell identifier does not belong to a black cell list configured in a MeasObject;
   the physical cell identifier does not intersect a physical cell identifier configured in a common control signaling of a target serving cell, wherein the target element is a target element of the target serving cell; or
   the physical cell identifier belongs to a predetermined physical cell identifier set in a predetermined MeasObject.

20. The method of claim 11, further comprising at least one of the following:
   after a predetermined time begins, the configuration of a measurement gap (MeasGap) is omitted for the measurement time of a first reference signal corresponding to the first-type parameter;
   before a predetermined time begins, the measurement time of a first reference signal corresponding to the first-type parameter is in the MeasGap;
   after a predetermined time begins, the configuration of an SSB-based RRM Measurement Timing Configuration (SMTC) is omitted for the measurement time of a synchronization signal corresponding to the first-type parameter;
   before a predetermined time begins, the measurement time of a synchronization signal corresponding to the first-type parameter is in an SMTC;
   after a predetermined time begins, a resource occupied by a second reference signal corresponding to the first-type parameter is not an available resource of the predetermined information element;
   before a predetermined time begins, a resource occupied by a second reference signal corresponding to the first-type parameter is an available resource of the predetermined information element;
   wherein the predetermined time comprises one of the following: a predetermined time after the first signaling is received; or a predetermined time after a hybrid automatic repeat request acknowledgement (HARQ-ACK) feedback with regard to a PDSCH including the first signaling is sent;
   wherein at least one of the first reference signal or the second reference signal corresponding to the first-type parameter comprises a synchronization signal corresponding to the first-type parameter.

21. A device, comprising:
   at least one processor; and
   a memory configured to store at least one program, wherein the at least one program, when executed by the at least one processor, causes the at least one processor to perform the method of claim 1.

* * * * *